United States Patent
Baumeister

(10) Patent No.: US 9,918,557 B2
(45) Date of Patent: Mar. 20, 2018

(54) FURNITURE FITTING, ARRANGEMENT COMPRISING TWO FURNITURE FITTINGS, AND USE OF A FURNITURE FITTING

(71) Applicant: BAUMEISTER & SCHACK GmbH & CO. KG, Balingen-Ostdorf (DE)

(72) Inventor: Karlheinz Baumeister, Balingen (DE)

(73) Assignee: BAUMEISTER & SCHACK GmbH & CO. KG, Balingen-Ostdorf (DE)

( * ) Notice: Subject to any disclaimer, the term of this patent is extended or adjusted under 35 U.S.C. 154(b) by 0 days.

(21) Appl. No.: 15/202,965

(22) Filed: Jul. 6, 2016

(65) Prior Publication Data

US 2016/0331145 A1 Nov. 17, 2016

Related U.S. Application Data

(63) Continuation of application No. PCT/EP2015/050232, filed on Jan. 8, 2015.

(30) Foreign Application Priority Data

Jan. 8, 2014 (DE) .................... 20 2014 000 212 U

(51) Int. Cl.
*F16M 13/02* (2006.01)
*A47C 7/38* (2006.01)
(Continued)

(52) U.S. Cl.
CPC ............ *A47C 20/041* (2013.01); *A47C 1/034* (2013.01); *A47C 1/036* (2013.01); *A47C 1/037* (2013.01);
(Continued)

(58) Field of Classification Search
CPC ....... A47C 20/041; A47C 1/034; A47C 1/037; A47C 7/506; A47C 7/38; A47C 7/402; A47C 1/036; F16M 13/02
(Continued)

(56) References Cited

U.S. PATENT DOCUMENTS

| 935,208 | A | * | 9/1909 | Humphries | ............ | F16M 13/02 |
| | | | | | | 248/279.1 |
| 1,111,457 | A | * | 9/1914 | Henderson | ............. | A47C 17/23 |
| | | | | | | 5/13 |

(Continued)

FOREIGN PATENT DOCUMENTS

| AT | 12204 U1 | 1/2012 |
| AT | 511549 A1 | 12/2012 |

(Continued)

OTHER PUBLICATIONS

International Preliminary Report on Patentability for corresponding International Application No. PCT/EP2015/050232, dated Jul. 21, 2016.

(Continued)

*Primary Examiner* — Muhammad Ijaz
(74) *Attorney, Agent, or Firm* — Jason H. Vick; Sheridan Ross, PC

(57) ABSTRACT

The present disclosure relates to a furniture fitting comprising a support bracket, a first push element, a second push element, which is pivotable with respect to the first push element, and a third push element, which is longitudinally displaceable with respect to the second push element and pivotable with respect to the first push element, wherein a longitudinal displacement of the first push element effects a pivoting movement of the second push element with respect to the first push element and an extending movement of the third push element resulting therefrom. The present disclosure further relates to an arrangement comprising two furniture fittings and to beneficial uses of furniture fittings.

20 Claims, 12 Drawing Sheets

(51) Int. Cl.
| | |
|---|---|
| *A47C 1/036* | (2006.01) |
| *A47C 20/04* | (2006.01) |
| *A47C 7/40* | (2006.01) |
| *A47C 1/034* | (2006.01) |
| *A47C 1/037* | (2006.01) |
| *A47C 7/50* | (2006.01) |

(52) U.S. Cl.
CPC ............... *A47C 7/38* (2013.01); *A47C 7/402* (2013.01); *A47C 7/506* (2013.01); *F16M 13/02* (2013.01)

(58) Field of Classification Search
USPC .... 297/423.3, 217.3, 75, 259.2, 315; 5/12.2, 5/13, 18.1, 21; 248/276.1, 292.21, 285.1, 248/286.1, 287.1
See application file for complete search history.

(56) References Cited

U.S. PATENT DOCUMENTS

| | | | | |
|---|---|---|---|---|
| 4,141,524 | A * | 2/1979 | Corvese, Jr. ......... | A61G 7/0503 128/DIG. 26 |
| 4,168,860 | A * | 9/1979 | Garza .................... | B60N 2/203 297/92 |
| 4,512,048 | A * | 4/1985 | Isham ................ | A47C 17/1756 297/317 |
| 4,543,675 | A * | 10/1985 | Shrock ................. | A47C 17/161 5/18.1 |
| 4,780,918 | A * | 11/1988 | Hartline ............... | A47C 17/225 5/13 |
| 5,328,247 | A * | 7/1994 | Lovins ................... | A47C 7/506 297/423.3 |
| 5,597,210 | A * | 1/1997 | Pickard ................. | A47C 7/506 297/423.3 |
| 5,876,094 | A * | 3/1999 | Hoffman .............. | A47C 1/0352 297/259.2 |
| 6,929,323 | B2 * | 8/2005 | Enno ...................... | B64D 11/06 297/217.3 |
| 7,021,711 | B1 * | 4/2006 | Hoffman .............. | A47C 1/0355 297/270.1 |
| 7,188,812 | B2 * | 3/2007 | Wang ................. | F16M 11/2064 248/276.1 |
| 7,273,257 | B2 * | 9/2007 | De Vroe ................ | A47C 1/035 297/330 |
| 8,833,844 | B2 * | 9/2014 | LaPointe .............. | A47C 1/0355 297/259.2 |
| 9,408,472 | B2 * | 8/2016 | Kim .................... | B64D 11/0643 |
| 2002/0113478 | A1 * | 8/2002 | Kasahara ............ | B64D 11/0641 297/362.11 |
| 2004/0195895 | A1 * | 10/2004 | Sedlatschek ............. | A47C 7/38 297/408 |
| 2006/0103218 | A1 * | 5/2006 | De Vroe ................ | A47C 1/035 297/423.26 |
| 2006/0284466 | A1 * | 12/2006 | Van Druff .............. | B64D 11/06 297/365 |
| 2008/0007105 | A1 * | 1/2008 | Viger ....................... | A47C 7/38 297/408 |
| 2010/0242641 | A1 * | 9/2010 | Mackert ................. | A47C 1/025 74/89 |
| 2011/0203248 | A1 * | 8/2011 | Mackert ................. | A47C 1/025 59/84 |
| 2013/0341989 | A1 * | 12/2013 | Lin ........................ | A47C 7/506 297/423.28 |
| 2015/0054315 | A1 * | 2/2015 | Donovan .............. | A47C 1/0242 297/68 |
| 2015/0135432 | A1 * | 5/2015 | Murphy ................. | A47C 17/04 5/29 |
| 2016/0088945 | A1 * | 3/2016 | Lu ............................ | A47C 7/38 297/463.1 |
| 2016/0331145 | A1 * | 11/2016 | Baumeister ............ | A47C 1/036 |
| 2016/0345740 | A1 * | 12/2016 | Lu .......................... | A47C 17/04 |

FOREIGN PATENT DOCUMENTS

| | | |
|---|---|---|
| DE | 202006010395 U1 | 8/2006 |
| DE | 202007017997 U1 | 3/2008 |
| DE | 102011109668 A1 | 2/2013 |
| EP | 2638827 A1 | 9/2013 |

OTHER PUBLICATIONS

International Search Report for corresponding International Application No. PCT/EP2015/050232, dated Mar. 5, 2015.
Written Opinion for corresponding International Application No. PCT/EP2015/050232, dated Mar. 5, 2015.

* cited by examiner

FURNITURE FITTING, ARRANGEMENT COMPRISING TWO FURNITURE FITTINGS, AND USE OF A FURNITURE FITTING

CROSS-REFERENCES TO RELATED APPLICATIONS

This application is a continuation of International Patent Application PCT/EP2015/050232, filed on Jan. 8, 2015, designating the U.S., which has been published as WO 2015/104319 A1 in German language and claims priority to German utility model 20 2014 000 212.6, filed on Jan. 8, 2014. The entire contents of these applications are fully incorporated by reference herewith.

BACKGROUND

The present disclosure relates to the field of furniture fittings. More particularly, in some embodiments, the present disclosure relates to adjustable furniture fittings which may be used, for instance, for adjusting head parts and for adjusting food parts of pieces of furniture, for instance for seating furniture. The present disclosure further relates to an arrangement comprising two furniture fittings of that kind. The present disclosure further relates to beneficial uses of furniture fittings.

By way of example, furniture fittings may be used in seating furniture comprising a back rest and a head part which is pivotably attached to the back rest. Accordingly, seating furniture of that kind are arranged as seating furniture comprising a head reset adjustment feature. Seating furniture of that kind is generally known. Further, furniture fittings of a general kind are known. The furniture fittings are mounted to the seating furniture so as to enable a controlled adjustment of a head rest for increasing the seating comfort. The adjustment may be effected in a manual hand-driven fashion or by means of an electromotor.

Similarly, the furniture fittings may be also used for so-called foot part adjustment features, i.e. for seating furniture comprising a seating surface and a foot part and/or a leg rest which are pivotably attached to the seating surface.

Preferably, furniture fittings are used in pairs as each seating furniture typically comprises a certain width extension. Hence, the fittings may be received at outer ends (preferably adjacent to the outermost sides) of the head part. Such furniture fittings are typically mechanically coupled with one another. It may be also envisaged to couple more than two furniture fittings to one another when the seating furniture comprises a large width extension.

Furniture fittings that are known in the art are designed in an effortful fashion and—in terms of the installation space—not arranged in a room-saving fashion. For instance, with known furniture fittings, a formation of wrinkles at the upholstery of the seating furniture may occur when adjustable head parts are folded out. The wrinkle formation may involve an adverse, unattractive appearance. The formation of wrinkles is often experienced as low-quality.

In view of this, it is an object of the present disclosure to provide a furniture fitting which may diminish or even entirely avoid the drawbacks and problems set forth above.

It is a further object of the present disclosure to provide an arrangement which comprises two furniture fittings of that kind.

It is a further object of the present disclosure to provide beneficial uses of furniture fittings.

It is a further object of the present disclosure to provide furniture fittings that comprise a compact design and may be produced with little effort, for instance substantially on the basis of stamping-and-bending parts.

SUMMARY

In respect of the furniture fitting, these and other objects of the present disclosure are achieved by a furniture fitting comprising the following:
 a support bracket,
 a first push element,
 a second push element which is pivotable with respect to the first push element, and
 a third push element which is longitudinally displaceable with respect to the second push element and pivotable with respect to the first push element,
 wherein a longitudinal displacement of the first push element effects a pivot movement of the second push element with respect to the first push element and an extending movement of the third push elements resulting therefrom.

In accordance with certain embodiments of the present disclosure, the support bracket, the first push element, the second push element and the third push element are namely coupled with one another in such a way that, when the furniture fitting is adjusted (for instance for head rest adjustment or for foot rest adjustment) besides a pivot movement between the pairs of support bracket/first push element and second push element/third push element also a longitudinal displacement between the first push element and the support bracket and between the second push element and the third push element occurs. In this way, the furniture fitting may be pivoted but, when the pivot movement takes place, may be also extended and/or elongated.

In this way, the problem of the wrinkle formation of upholstered pads of seating furniture may be solved. In other words, the third push element is arranged at the second push element in a longitudinally displaceable fashion. The second push element is, in turn, attached to the support bracket in a pivotable and longitudinally slidable fashion via the first push element. A length compensation between the push elements ensures that in an fully collapsed state and also up to an fully folded out state, the upholstery of the seating furniture remains tightly stretched. The furniture fitting is stable, resilient and comfortable and enables a length compensation and/or a length adaption feature.

In other words, the present disclosure relates to a mechanical furniture fitting which may be supplemented in an electronic and/or electromotive fashion. The furniture fitting basically comprises a support bracket, a first push element, a second push element and a third push element. The first push element may comprise a spindle which is coupled with a powered drive, for instance with an electromotor. In this way, a driving lifting movement of the first push element with respect to the support bracket may be effected. The support bracket and the first push element are coupled with one another in a non-rotatable fashion. The lifting movement effects a displacement of the first push element with respect to the support bracket. A pivoting lifting movement of the second push element results therefrom by means of which, in turn, an additional lifting movement may be exerted to the third push element. The second push element and the third push element are coupled to one another in a longitudinally displaceable non-rotatable fashion.

A further potential feature of the afore-mentioned embodiment of the furniture fitting is that also a manual adjustment without using a motor is enabled. This is difficult or not possible at all with known motor-powered furniture fittings. A reason for this is that the movement may be only generated on the part of the motor and may be fed into the furniture fitting for adjustment thereof. The side or the end of the furniture fitting which is engaged by the motor is referred to as actuator side. With a furniture fitting in accordance with the above-described aspect it may be envisaged to engage, for manual adjustment, both the first push element (i.e. as mentioned above on the "actuator" part) and also—as an alternative thereto—the third push element (i.e. within the above meaning on the "passive" part) to adjust the furniture fitting in a manual fashion.

The arrangement of the furniture fitting in accordance with the present disclosure enables a particularly compact design. Further, furniture fittings in accordance with certain embodiments of the present disclosure may be incorporated in upholsteries of pieces of furniture in an invisible fashion. This is a huge visual advantage. Such a design is commonly perceived and/or experienced as high-quality. Further, the integral arrangement increases the operator safety. In this way, there is thus no huge risk of shearing points or clamping points where for instance a user of the piece of furniture might get injured.

Two furniture fittings that are arranged in accordance with the above described aspect may be fixedly attached to one another. In this way, a further drive at the second furniture fitting may be dispensed with when the first furniture fitting is already provided with a drive. The fixed connection may be for instance achieved by a rectangular tube which is fixedly connected with a recess in the third push element of both furniture fittings.

According to a beneficial embodiment of the furniture fitting, a pivot movement of the second push element about a bearing at the first push element effects, via a coupling mechanism, for instance a lever mechanism, an extending movement of the third push element. This may be, for instance, caused by an appropriate coupling mechanism which transfers a driving movement into a desired output movement, wherein for instance a (longitudinal) push movement may be converted into a pivot movement.

According to a further embodiment, the support bracket and the first push element are assigned to a first slide joint unit, wherein the first push element is arranged at the support bracket in a longitudinally displaceable fashion. Further, according to a further embodiment, the second push element and the third push element are assigned to a second slide joint unit, wherein the third push element is arranged at the second push element in a longitudinally displaceable fashion.

Overall, a furniture fitting may be thus provided which comprises a first slide joint unit and at least a further slide joint unit, wherein each slide joint unit comprises two push elements that are longitudinally displaceable with respect to one another. The first slide joint unit involves the support bracket and the first push element. The second slide joint unit involves the second push element and the third push element. The first slide joint unit and the second slide joint unit are pivotably coupled to one another via the coupling mechanism. The coupling mechanism enables a force-controlled movement which involves exactly one degree of movement freedom (F=1) for the coupling mechanism. The force-controlled movement may for instance involve that a drive at only one of the elements effects the desired movement of all further elements of the slide joint units. For instance, a driving movement may be exerted on the first push element when the first push element is manually or motor-powered displaced with respect to the support bracket in a longitudinal direction. This longitudinal movement may effect the relative pivot movement of the second push unit relative to the first push unit and the relative longitudinal displacement between the second push element and the third push element.

According to a further embodiment of the furniture fitting, the support bracket, the first push element, the second push element and the third push element form components of a planar coupling mechanism. In an exemplary embodiment, the support bracket, the first push element, the second push element and the third push element are oriented in a fashion parallel to one anther. In this way, an extremely compact flat design may be achieved.

Compared to known furniture fittings, in some embodiments, spatial coupling mechanisms may be dispensed with. Spatial coupling mechanisms have several draw backs. This involves, amongst others, a huge required installation space and an increased manufacturing and assembling effort.

According to a further embodiment of the furniture fitting, at least at the support bracket or at the first push element, an elongated slot is formed as a guide for a longitudinal displacement between the support bracket and the first push element. Similarly, according to a further embodiment, at least at the second push element or at the third push element, an elongated slot is formed as a guide for a longitudinal displacement between the second push element and the third push element. The elongated slot for the longitudinal displacement may be arranged, in some embodiments, as an elongated hole. According to a refinement of the aforementioned embodiments, two guide elements are assigned to the at least one elongated slot, wherein the two guide elements engage the elongated slot and are received therein in a slidable fashion. In some embodiments, the guide elements may be arranged as guide bolts that are spaced from one another.

In other words, each slide joint unit may comprise a combination of an elongated slot and a plurality of guide elements which are received in the elongated slot in a longitudinally displaceable fashion. For instance, the guide slot is incorporated in the first push element of the first slide joint unit. Accordingly, the guide elements are arranged at the support bracket. For instance, at the second slide joint unit, the guide elements are received at the third push element. Accordingly, the elongated slot is incorporated in the second push element. It goes without saying that the assignment of the guide elements and the elongated slot to the components of the slide joint units may be also present in an opposite fashion.

According to a further embodiment, the second push element is pivotably mounted at the first push element, wherein the second push element is coupled with the support bracket via a first linking piece, for instance via a first lever. The first linking piece may be referred to as coupling lever.

Overall, the support bracket, the first push element, the second push element and the first linking piece may form a first four joint linkage mechanism which comprises three swivel joints and a slide joint. The support bracket and the first push element are coupled to one another via a slide joint. The second push element and the first push element are coupled to one another via a swivel joint. The first linking piece is coupled with the support bracket and the second push element via a respective swivel joint. In an exemplary embodiment, the four joint linkage mechanism comprises exactly one degree of freedom (F=1).

In an exemplary refinement of this arrangement, the first linking piece effects a pivot movement of the second push element relative to the first push element when a longitudinal displacement between the support bracket and the first push element takes place.

According to a further embodiment of the furniture fitting, the third push element is coupled with the first push element via a second linking piece, for instance via a second lever. The second linking piece may be also referred to as second coupling lever. In other words, in this way, by means of the first push element, the second push element, the third push element and the second linking piece, a further four joint linkage mechanism may be formed. The second four joint linkage mechanism may be also referred to as four joint linkage mechanism comprising a slide joint. The slide joint is formed between the second push element and the third push element. The second push element is pivotably received at the first push element via a swivel joint. The second linking piece is coupled with the first push element and the third push element via a respective swivel joint.

According to a refinement of this embodiment, the second linking piece effects a longitudinal displacement between the second push element and the third push element when a relative pivot movement between the first push element and the second push element takes place.

Overall, a coupling mechanism may be thus provided which combines two four joint linkage mechanisms in a beneficial fashion. Both four joint linkage mechanisms may be arranged as four-joint-linkage having three swivel joints and one slide joint. Both four joint linkage mechanisms comprise, in an exemplary embodiment, a common swivel joint. In other words, both four joint linkage mechanisms are oriented in a fashion parallel to one another.

According to a further embodiment, the first linking piece and the second linking piece are arranged at sides of the first push element that are facing away from one another, wherein the first push element is arranged between the first linking piece and the second linking piece. In an exemplary embodiment, also the second push element and the third push element are arranged between the first linking piece and the second linking piece. In this way, a flat design may be achieved. The required installation space of the furniture fitting is considerably small.

According to a further embodiment, the first push element and the third push element are arranged in a common plane which is offset from a plane in which the second push element is arranged. In other words, the first push element, the second push element and the third push element may be arranged in a fashion parallel to one another, wherein the first push element and the third push element are aligned with one another, i.e. substantially extend in the same plane. The second push element is, by contrast, arranged in an offset plane which is parallel thereto, wherein the second push element may overlap the first push element and the third push element so as to be coupled with the two, for instance via a swivel joint and a slide joint.

According to a further embodiment, the furniture fitting comprises a fourth push element and a fifth push element, wherein the fourth push element and the fifth push element are assigned to a third slide joint unit, and wherein the fifth push element is longitudinally displaceable received at the fourth push element.

In other words, for instance the first slide joint and the second slide joint may form a first and a second stage of the furniture fitting. The third slide joint unit may form a further, third stage of the furniture fitting. Overall, the first slide joint unit, the second slide joint unit and the third slide joint unit may define a kinematic chain, wherein the second slide joint unit is arranged between the first slide joint unit and the third slide joint unit. In an exemplary embodiment, the design of the third slide joint unit and the coupling of the third slide joint unit with the second slide joint unit is made in analogy to the design of the second slide joint unit and the coupling of the second slide joint unit with the first slide joint unit. In this way, a furniture fitting may be provided which, in total, provides an even larger pivot angle and an even larger extension travel between the first slide joint unit and the third slide joint unit.

According to a refinement of this embodiment, the fourth push element is pivotably mounted at the third push element, wherein the fourth push element is coupled with the second push element via a third linking piece, for instance via a third lever, and wherein the fifth push element is coupled with the third push element via a fourth linking piece, for instance via a fourth lever. The linking pieces may be also referred to as coupling levers.

In other words, between the second slide joint unit and the third slide joint unit, a second coupling mechanism may be provided, which is arranged in a fashion at least similar to the first coupling mechanism which is formed between the first slide joint unit and the second slide joint unit.

Accordingly, a beneficial refinement of the furniture fitting may be provided, wherein the third linking piece effects a pivot movement of the fourth push element with respect to the third push element when a longitudinal displacement between the third push element and the second push element takes place, and wherein the fourth linking piece effects a longitudinal displacement between the fourth push element and the fifth push element when a relative pivot movement between the third push element and the fourth push element is present.

Accordingly, also the second coupling mechanism may comprise two four joint linkage mechanisms. In an exemplary embodiment, each of the two four joint linkage mechanisms (also: third four joint linkage mechanism and fourth four joint linkage mechanism) is arranged as a four joint linkage mechanism comprising three swivel joints and a slide joint.

Basically, the furniture fitting may be adjusted or moved between a retracted and an extracted state. When the adjustment movement takes place, also a relative pivot movement is present at slide joint units that are directly coupled with one another. The overall movement of the furniture fitting may be therefore also referred to as combined movement involving relative longitudinal displacements and relative pivot movements.

According to a further embodiment of the furniture fitting, at least some of the push elements, in an exemplary embodiment all push elements, are arranged as basically flat sheet metal parts. It is further preferred that at least some of the push elements are arranged as planar punched parts made from sheet metal material.

This may on the one hand further contribute to a reduction of the installation space. Moreover, the manufacturing effort for manufacturing the furniture fitting may be further reduced. It goes without saying that at least small design elements may be arranged as elements that deviate from the flat design. This may basically involve stiffening beads and such like. Further, also notches, lugs, noses and similar parts may be envisaged which protrude beyond the flat shape.

In an exemplary embodiment, at least some of the push elements are arranged in a nearly or fully identical fashion. This may further streamline the production. For instance, it may be envisaged to form a specific hole pattern for the swivel joints and similar attachment parts at the push elements. Depending on the actual use and/or the actual operation purpose, it may be then envisaged to use only some of the holes, recesses or bores.

According to a further embodiment, the support bracket comprises a first support bracket piece and a second support bracket piece which are formed from sheet metal material and which may be arranged in a basically mirror-symmetric fashion, wherein the first support bracket piece and the second support bracket piece define therebetween a guide gap for the first push element. According to a further embodiment, at least the first support bracket piece or the second support bracket piece of the support bracket comprises a bending which is arranged as a mounting lug for mounting at a piece of furniture. The bending may for instance involve a 90° bending.

According to a further embodiment of the furniture fitting, the first push element is coupled with a threaded spindle which is guided in a bearing piece which is received at the support bracket. For instance, the bearing piece comprises an inner thread which is adapted to an outer thread of the threaded spindle. Either the bearing piece or the threaded spindle may be driven in a rotational fashion so as to effect a relative movement between the threaded spindle and the bearing piece. In this way, a translational push movement or lifting movement of the first push element with respect to the support bracket may be effected. The drive may involve a manual drive or a powered drive. According to an exemplary arrangement, the bearing piece is arranged as a spindle nut.

According to one embodiment, the furniture fitting thus further comprises an electromotive drive. In addition or in the alternative, it may be envisaged to adjust the furniture fitting in a manual fashion (hand-operated). A manual drive may be basically arranged as a main drive of the furniture fitting. However, it may be also envisaged to provide the manual drive as an emergency drive. A manual emergency drive may be for instance used when the electromotive drive cannot be supplied with energy and/or when a defect is present at the electromotive drive. In an exemplary embodiment, the electromotive drive is arranged to be decoupled from the first push element so as to enable a manual drive. In the alternative, it may be envisaged that, when a manual adjustment of the furniture fitting is present, the electromotive drive is so-to-say passively driven when the first push element is displaced relative to the support bracket as a result of a manual impact on the furniture fitting.

In an exemplary embodiment, the electromotive drive comprises a retaining torque which is sufficiently large to prevent a self-adjustment of the furniture fitting. In the alternative or in addition, embodiments may be envisaged, wherein the coupling of the electromotive drive or the manual drive with the first push element is provided by a force transmission unit (such as a gear) which is arranged in a self-retaining fashion. A self-retaining mechanism may be operated only by a defined driving side so as to provide a defined output movement at an output. When such a self-retaining mechanism is operated at the output, no resulting movement is present at the (input) driving side.

Nevertheless, also embodiments may be envisaged wherein the self-retaining feature is deliberately avoided so as to enable a manual adjustment, wherein an impact is deliberately at the "output", for instance at the second slide joint unit or at the third slide joint unit. In an exemplary embodiment, a locking element is provided which is arranged to impact on the furniture fitting in such a way that any relative movement between the support bracket and the push elements is efficiently prevented.

In respect of the arrangement, the above indicated and further objects of the present disclosure are achieved by an arrangement comprising a furniture fitting in accordance with at least one of the afore-mentioned aspects, wherein the furniture fitting is arranged as a first furniture fitting and associated with a second furniture fitting in a force coupled fashion in such a way that the second furniture fitting is moved together with the first furniture fitting.

The first furniture fitting may be also referred to as primary furniture fitting or as master. The second furniture fitting may be also referred to as secondary furniture fitting or as slave. It goes without saying that also more than two furniture fittings may be coupled with one another, for instance with seating furniture having an excessive width.

According to a further embodiment of the arrangement, the first furniture fitting and the second furniture fitting are coupled to one another via a linking piece, for instance via an attachment tube which engages, in an exemplary embodiment, recesses of the third push elements of the first furniture fitting and the second furniture fitting.

When the furniture fittings are arranged as three-stage furniture fittings and accordingly also comprise a third slide joint unit, it may be an option to couple the linking piece with the fifth push elements of both furniture fittings. It goes without saying that also a plurality of parallel linking pieces may be envisaged which respectively connect push elements of the same kind, or the support bracket of both furniture fittings to one another.

According to a refinement of the above-described embodiment of the arrangement, a lug is respectively assigned to the recesses of the third push elements, wherein the lug is arranged for fixation of the linking pieces. When the recesses are arranged at other push elements, a respective lug may be arranged there as well. The lug may be for instance arranged as bended notch of the flat material of the push element. In an exemplary embodiment, the lug is an integral component of the third push element. It goes without saying that the lug comprises a main extension direction which deviates from the substantially flat extension of the push element.

Furniture fittings which are arranged in accordance with the aspects described herein may be used as furniture fittings for head rest adjustment for seating furniture. A further beneficial use of such furniture fittings is the use as a furniture fitting for foot part adjustment for a seating furniture. In an exemplary embodiment, the two-stage embodiment of the furniture fitting with the first slide joint unit and the second slide joint unit is suited for head rest adjustment. The three-stage embodiment of the furniture fitting comprising a first slide joint unit, a second slide joint unit and a third slide joint unit is suited for foot part adjustment for seating furniture, for instance.

Further beneficial uses of the furniture fittings may be envisaged without further ado. In an exemplary embodiment, the furniture fitting may be arranged as a carrier for a foldable working device for a working furniture. This may for instance involve a working plate. In an exemplary embodiment, the furniture fitting may be also used as a carrier for a fold-out display device or input device. More generally, this may involve that the working device is arranged as a working plate, a foldable table and such like. However, it may be also envisaged to use the furniture fitting as a carrier for a Monitor or a similar display device. The working device may be for instance moved between a first, retracted position and a second, extended position.

It is understood that the above-mentioned features of the present disclosure and those to be explained in the following can be applied, not only in the respective specified combination, but also in other combinations or singly, without departing from the scope of the present disclosure.

BRIEF DESCRIPTION OF THE DRAWINGS

Further features and advantages of the present disclosure are disclosed by the following description of a plurality of exemplary embodiments, with reference to the drawings, wherein.

DETAILED DESCRIPTION OF EXEMPLARY EMBODIMENTS

Figure 1:
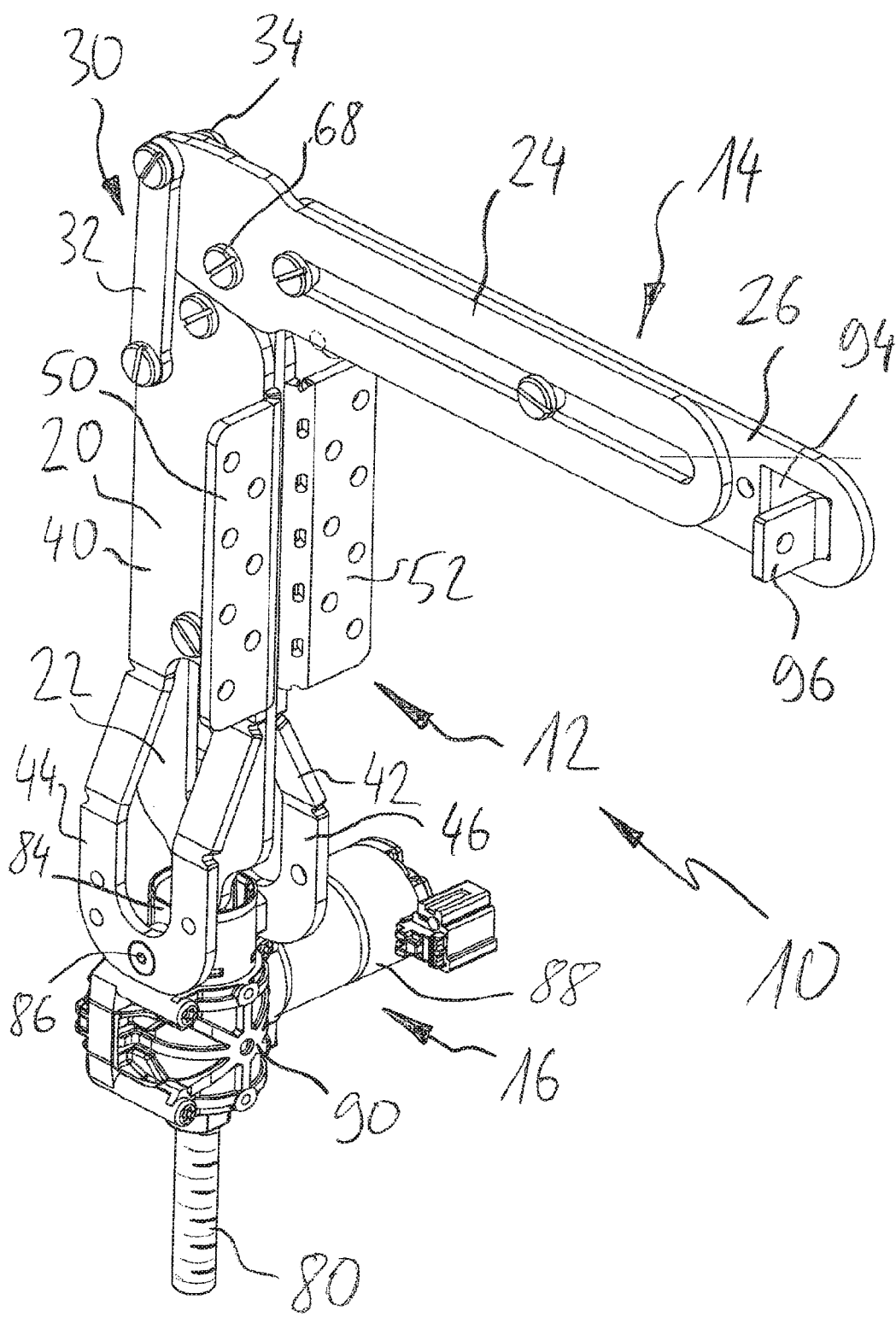
FIG. 1 shows a perspective schematic illustration of an embodiment of a furniture fitting in a first, folded-in state.
Figure 2:
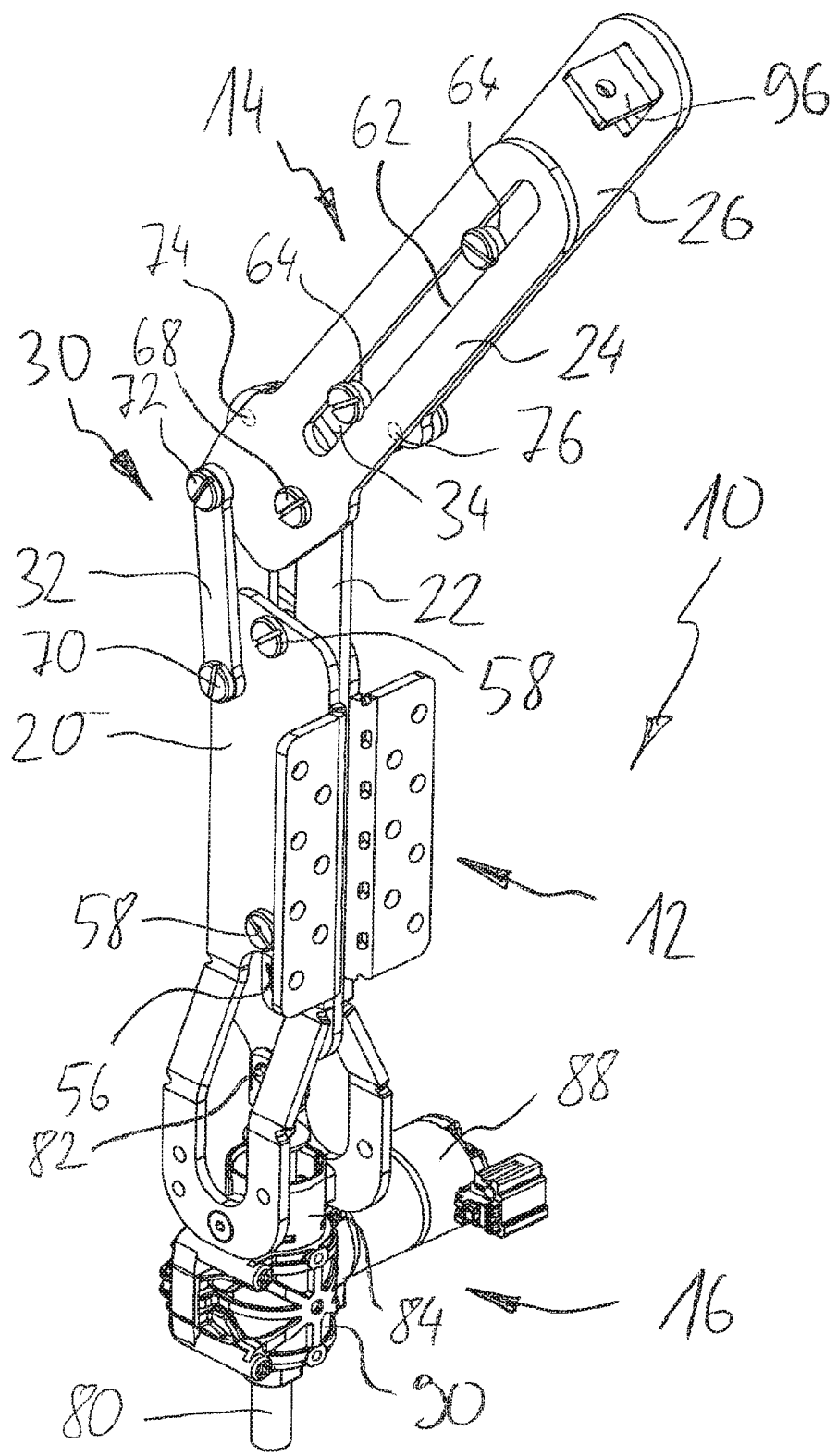
FIG. 2 is a perspective schematic view of the furniture fitting according to FIG. 1 in an intermediate state.

With reference to FIGS. 1 to 5, an exemplary embodiment of a furniture fitting will be elucidated, wherein the furniture fitting in its entirety is designated by 10. The furniture fitting 10 is arranged as an adjustable furniture fitting 10. In an exemplary embodiment, the furniture fitting 10 is adjustable between a first position and a second position. The first position can be seen in FIG. 1. A second position can be for instance seen in FIG. 3. The first position and the second position may respectively represent extreme states. The first position according to FIG. 1 may be for instance a retracted or folded-in state. The second position according to FIG. 3 may be for instance an extracted or folded-out state. FIG. 2 illustrates an intermediate position of the furniture fitting 10 between the first position according to FIG. 1 and the second position according to FIG. 3.

It goes without saying that the furniture fitting 10 may assume further intermediate positions. Hence, the furniture fitting 10 is on the one hand suited for a step less adjustment of components of pieces of furniture, for instance of seating furniture. However, it may be also envisaged to use the furniture fitting 10 for attachment parts or components of pieces of furniture, for instance of seating furniture, which involve merely two discrete positions, for instance a retracted and an extracted position. It may be also envisaged to arrange the furniture fitting 10 in such a way that a plurality (but not an infinite number) of intermediate positions is enabled.

Figure 3:
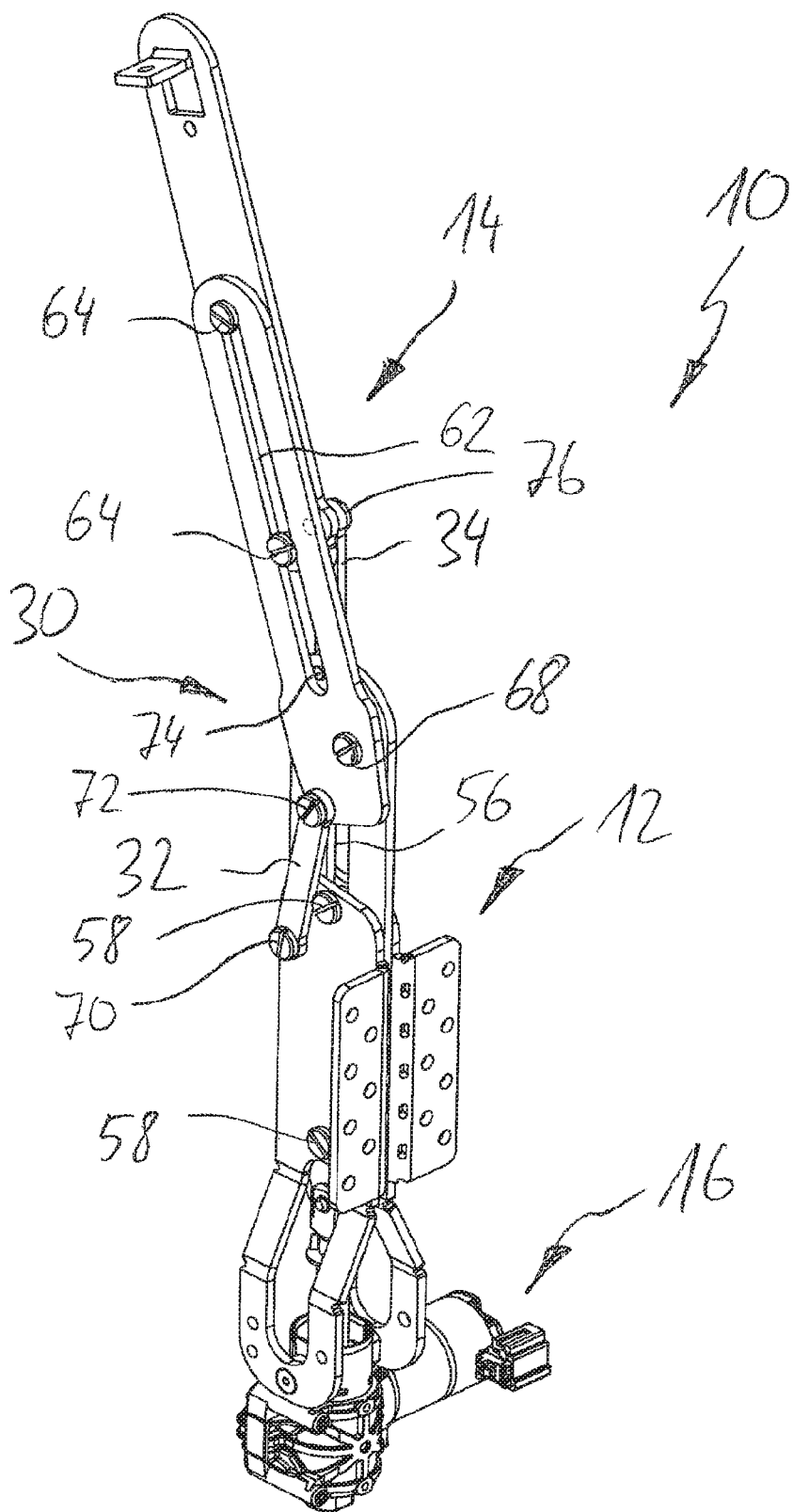
FIG. 3 is a further perspective view of the furniture fitting of FIG. 1 in a second, folded-out state.
Figure 4:
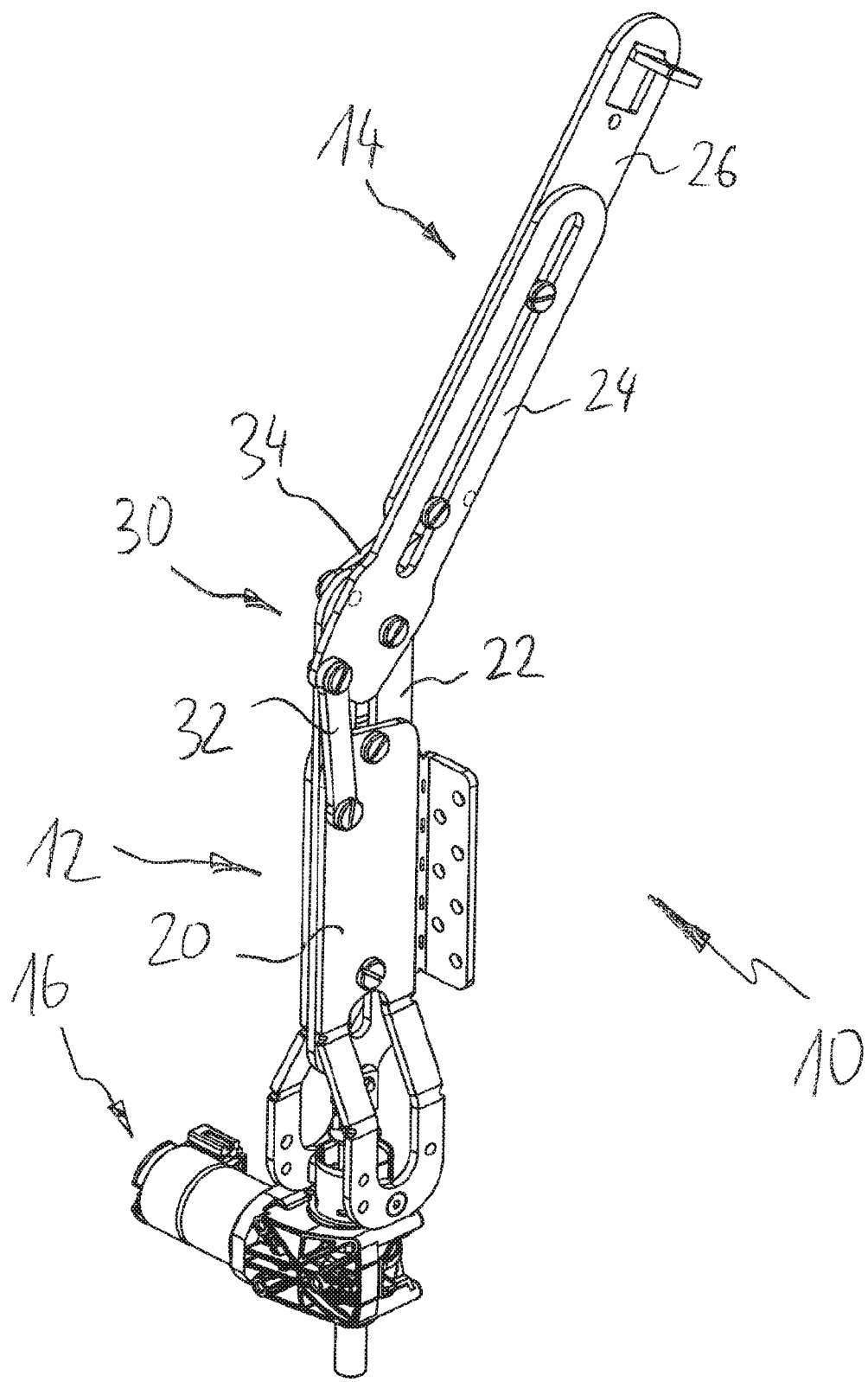
FIG. 4 is yet a further perspective schematic view of the furniture fitting of FIG. 1, in a state according to FIG. 2 in a view orientation that is different from those of FIGS. 1, 2 and 3.
Figure 5:
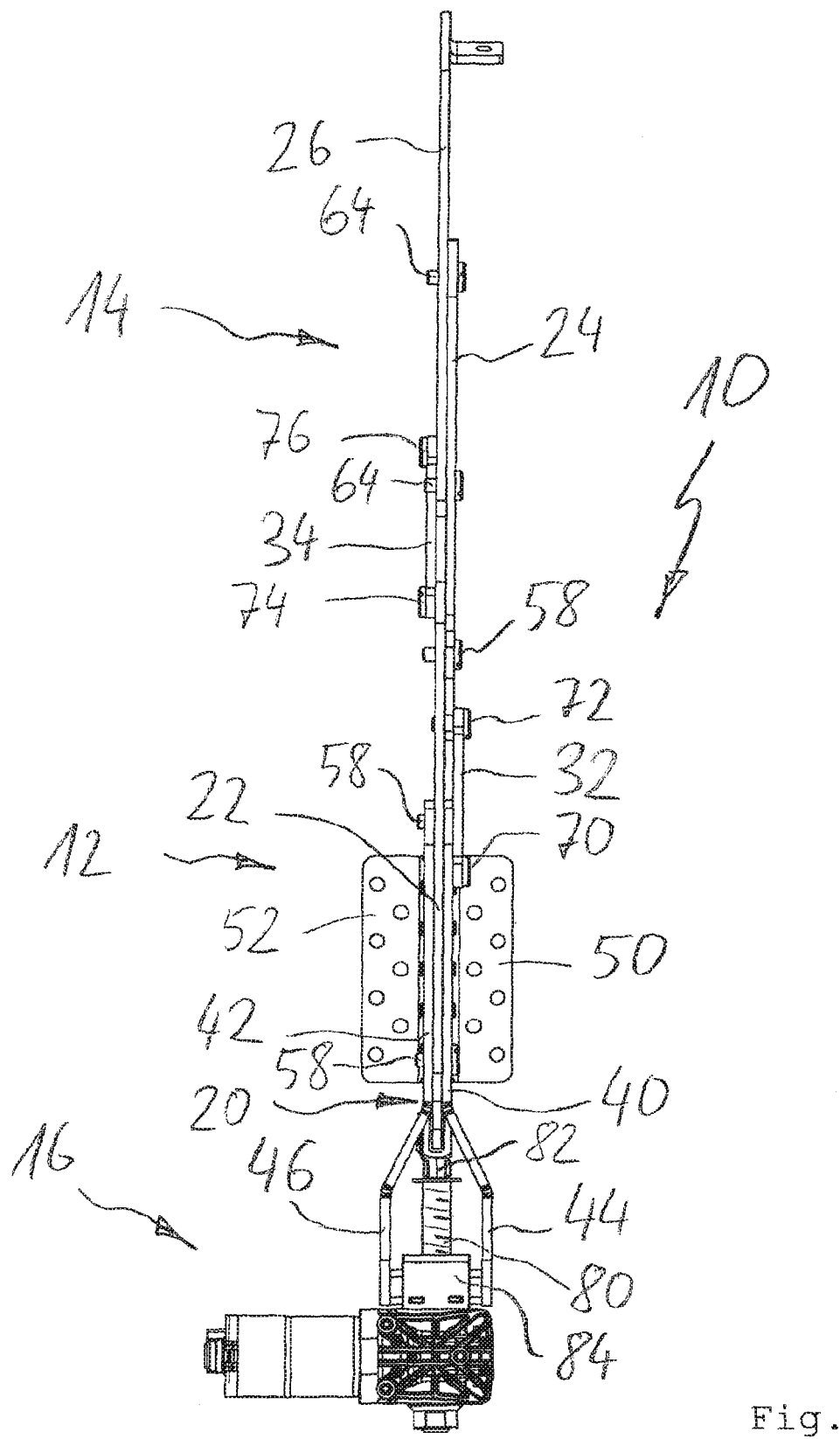
FIG. 5 is a frontal view of the furniture fitting of FIG. 1 in the orientation according to FIG. 3.

The position of the furniture fitting 10 which is shown in FIG. 4 corresponds to the position of FIG. 2. FIG. 2 and FIG. 4 primarily differ from one another in that a changed view orientation is provided. The frontal view of the furniture fitting 10, which is shown FIG. 5, illustrates the furniture fitting 10 in analogy to the arrangement of in FIG. 3 in the second, extracted or folded-out position. FIGS. 3 and 5 primarily differ from one another in their view orientation.

The furniture fitting 10 comprises a first slide joint unit 12 and a second slide joint unit 14 which are coupled to one another in an appropriate fashion. In this way, a slide joint chain may be implemented which comprises at least two stages. Hence, the first slide joint unit 12 may be also referred to as first stage. Accordingly, the second slide joint unit 14 may be also referred to as second stage. Further, a drive unit 16 is provided at the furniture fitting 10 which is coupled with first slide joint unit 12, for instance. The drive unit 16 may basically enable a motor-powered drive, however, in the alternative, also a manual drive for the furniture fitting 10. Also a combination of a motor-powered drive and a manual drive which may be merely arranged as an emergency drive may be envisaged.

Essential components of the furniture fitting 10 shown in the FIGS. 1 to 5 are a support bracket 20, a first push element 22 which is received at the support bracket 20 in a longitudinally displaceable fashion, a second push element 24 which is received at the first push element 22 in a pivotable fashion, and a third push element 26 which is arranged at the second push element 24 in a longitudinally displaceable fashion. The support bracket 20 and the first push element 22 may be commonly assigned to the first slide joint unit 12. The second push element 24 and the third push element 26 may be commonly assigned to the second slide joint unit 14. In other words, the support bracket 20 and the first push element 22 may form the first stage of the furniture fitting 10. Accordingly, the second push element 24 and the third push element 26 may form the second stage of the furniture fitting 10.

The support bracket 20 which is elucidated with reference to FIGS. 1 to 5 exemplarily comprises a first support piece 40 and a second support piece 42 which are attached to one another to define therebetween a gap for the first push element 22, wherein the first push element 22 is guided in a longitudinally displaceable fashion in the gap. The first support piece 40 and the second support piece 42 may be arranged in a basically symmetric, particularly mirror-symmetric fashion. At the first support piece 40, an offset piece 44 is formed. At the second support piece 42, an offset piece 46 is formed. The offset pieces 44, 46 define therebetween a receiving area in which components of the drive unit 16 may be received. Further, at the first support piece 40, a first mounting lug 50 is formed which may be for instance formed by a bending. At the second support piece 42 a second mounting lug 52 is formed which may be for instance generated by a bending. The mounting lugs 50, 52 may define a common receiving plane and may be for instance provided with recesses, for instance holes or such like, by which the furniture fitting 20 may be fixed to a piece of furniture, for instance at a frame thereof.

The support pieces 40, 42 may be basically manufactured from a semi-finished material, for instance from a sheet metal material. The offset pieces 44, 46 and the mountings lugs 50, 52 may be formed by appropriate separating processes and/or reshaping processes.

The support bracket 20 and the first push element 22 are coupled to one another via a slide joint. The slide joint comprises an elongated slot 56 and two guide elements 58 arranged as guide bolts that are spaced from one another. For instance, the elongated slot 56 may be formed in the first push element 22. Accordingly, two or more guide elements 58 arranged as guide bolts may be provided at the support bracket 20 in a fashion spaced from one another, and may engage the elongated slot 56 in the mounted state. In this way, the first push element 22 is received at the support bracket 20 in a longitudinally displaceable fashion.

The first slide joint unit 12 and the second slide joint unit 14 are coupled with one another by a first coupling mechanism 30. The first coupling mechanism 30 comprises a first linking piece 32 and a second linking piece 34. The linking pieces, 32, 34 may be also referred to as lever or coupling lever. The first linking piece 32 is coupled with the support bracket 20 and the second push element 24 by a respective swivel joint, refer also to FIG. 1. The second linking piece 34 is coupled with the first push element 22 and the third push element 26 by a respective swivel joint, refer particularly to FIGS. 3, 4 and 5.

Hence, the support bracket 20, the first push element 22, the second push element 24 and the first linking piece 32 form a coupling mechanism, for instance a four joint linkage mechanism which may be also referred to as planar four-joint-chain. The four-joint comprises three swivel joints and a slide joint guide elements 58, elongated slot 56). The swivel joints are respectively formed between the first linking piece 32 and the support bracket 20 and the second push element 24; and between the second push element 24 and the first push element 22.

The pivot point between the first push element 22 and the second push element 24 comprises a bearing 68. The swivel joints between the first linking piece 32 and the support bracket 20 and/or the second push element 24 may be also referred to as coupling points 70, 72, refer also to FIG. 2 and FIG. 3.

The second linking piece 34, the first push element 22, the second push element 24 and the third push element 26 together form a second coupling mechanism, which is for instance arranged as a planar coupling mechanism. The coupling mechanism may be also referred to as four joint linkage mechanism. The four-joint comprises three swivel joints and a slide joint. The slide joint is formed between the second push element 24 and the third push element 26. The slide joint is, for instance, formed by an elongated slot 62 and two guide elements 64 arranged as guide bolts. For instance, the elongated slot 62 is formed at the second push element 24. Accordingly, the guide elements 64 are spaced from one another and arranged at the third push element 26 so as to receive the third push element 26 in a longitudinally displaceable fashion at the second push element 24.

Further, the four-joint comprises three swivel joints. A swivel joint is provided by the bearing 68 by which the push element 24 is mounted at the first push element 22 in a pivotable or rotatable fashion. Further swivel joints may be provided by coupling points 74, 76. The coupling point 74 comprises a swivel joint between the second linking piece 34 and the first push element 22. The coupling point 76 comprises a swivel joint between the second linking piece 34 and the third push element 26.

It can be particularly seen from FIG. 5 that the furniture fitting 10 is formed in a considerably compact and flat fashion. In an exemplary embodiment, the first coupling mechanism 30 is not arranged as a spatial coupling mechanism but rather as a combination of two planar four-joint linkage mechanisms. The width of the furniture fitting 10 is not changed when the mechanism is adjusted.

Assuming that the sheet metal material from which the support bracket 20, the push elements 22, 24, 26 and also the linking pieces 32, 34 are manufactured comprises a uniform thickness, the minimum overall thickness of the furniture fitting 10 amounts to no more than the quadruple of the single sheet metal thickness as maximally four respective components are placed on top of one another, refer particularly to FIG. 5 from which it can be seen that for instance the support pieces 40, 42, the push element 22 which is arranged between the support pieces 40, 42, and the first linking piece 32 which is arranged at the support bracket 20 define a region of maximum thickness of the furniture fittings 10. It goes without saying that attachment parts, mounting parts and such like may be provided which may protrude beyond said width (height) of the furniture fitting 10, refer for instance to the mounting lugs 50, 52 and to components of the drive unit 16.

It can be particularly seen from FIG. 5 that the first push element 22 is coupled with a spindle or threaded spindle 80. The spindle 80 is coupled with the first push element 22 via a connector piece 82. The spindle 80 is further mounted at a bearing piece 84 which, in turn, is mounted via mounting receptacles 86 (refer to FIG. 1) at the support bracket 20 in the region of the offset pieces 44, 46. In this way, via the drive unit 16, the spindle 80 may be actuated in such a way that a longitudinal displacement (lifting movement) of the first push element 22 with respect to the support bracket 20 is effected. When the furniture fitting 10 is provided with a motorized drive unit 16, the drive unit 16 comprises an electromotor 88 which is coupled with a force transmission unit 90 which may be also referred to as gear. Via the force transmission unit 90, the motor 88 may act on the threaded spindle or spindle 80 so as to displace the first push element 22 in relation to the support bracket 20.

Similarly, also a manual actuator feature may be arranged, wherein a user may for instance actuate the spindle 80 by means of a hand wheel and such like so as to adjust the furniture fitting 10. Also with a manual actuation feature, a force transmission unit 90 may be provided which may be for instance arranged as a gear. In at least some exemplary embodiments, the force transmission unit 90 is arranged as a so-called self-retaining force transmission unit 90. In this way, the furniture fitting 10 may be safely retained in a respective state without the risk of an undesired self-adjustment.

At the third push element 26, a recess 94 is provided, wherein a lug 96 is arranged in proximity thereof. The lug 96 may involve a bending with respect to a longitudinal extension of the third push element 26. The recess 94 and the lug 96 associated thereto may be used to fixedly attach the third push element 26 in the desired fashion to the piece of furniture, for instance to components of the piece of furniture which shall be adjusted, for instance a head rest or a foot rest. In the alternative, the recess 94 and the lug 96 associated thereto may be also used to form an arrangement comprising two or more similar furniture fittings 10, refer also to FIG. 9.

Figure 6:
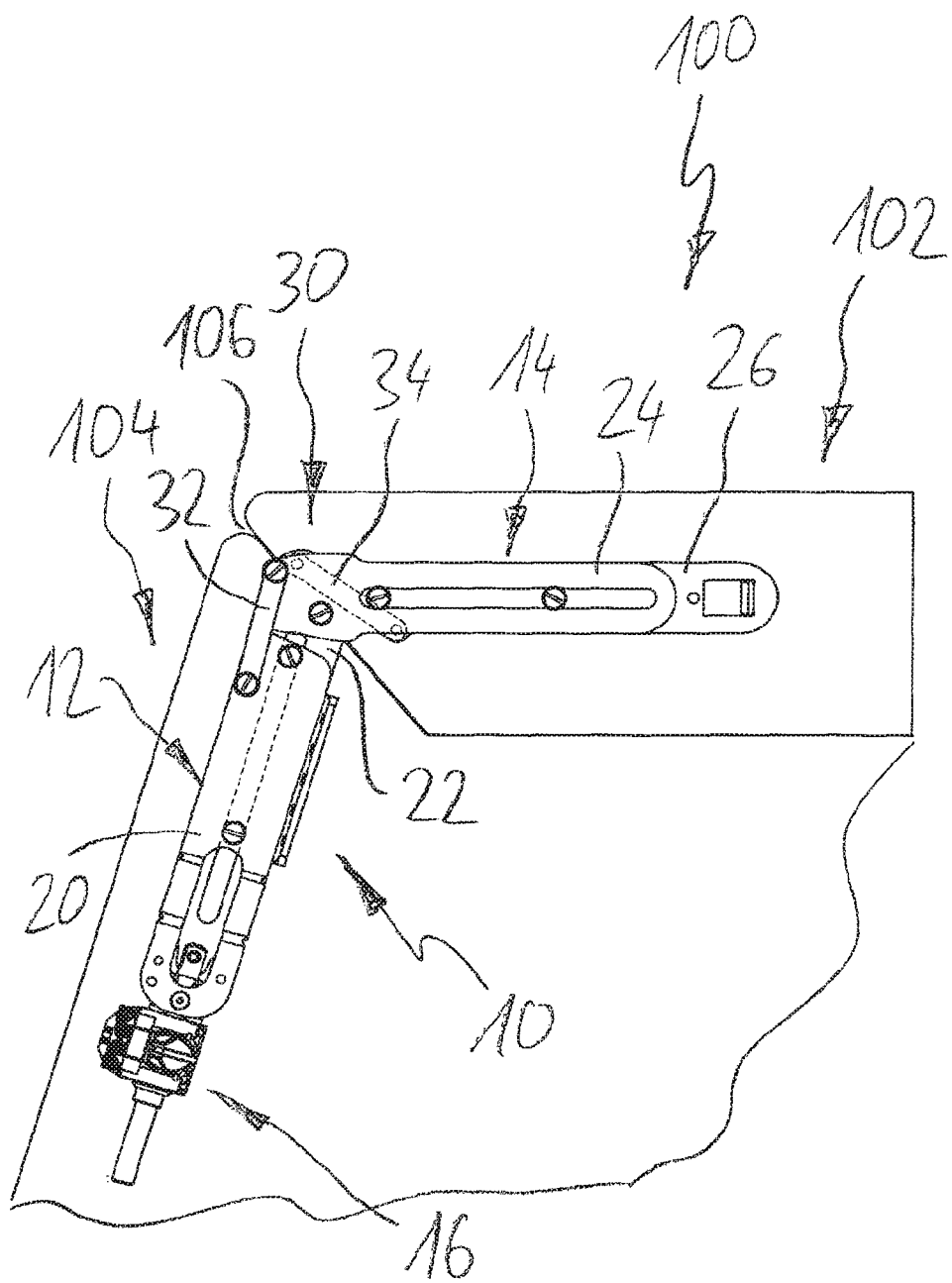
FIG. 6 is a greatly simplified schematic partial side view of a seating furniture comprising an adjustable head part, wherein a furniture fitting is provided for the adjustment thereof, the furniture fitting being arranged similar to the furniture fitting of FIG. 1, wherein the head part is shown in a folded-in state.
Figure 7:
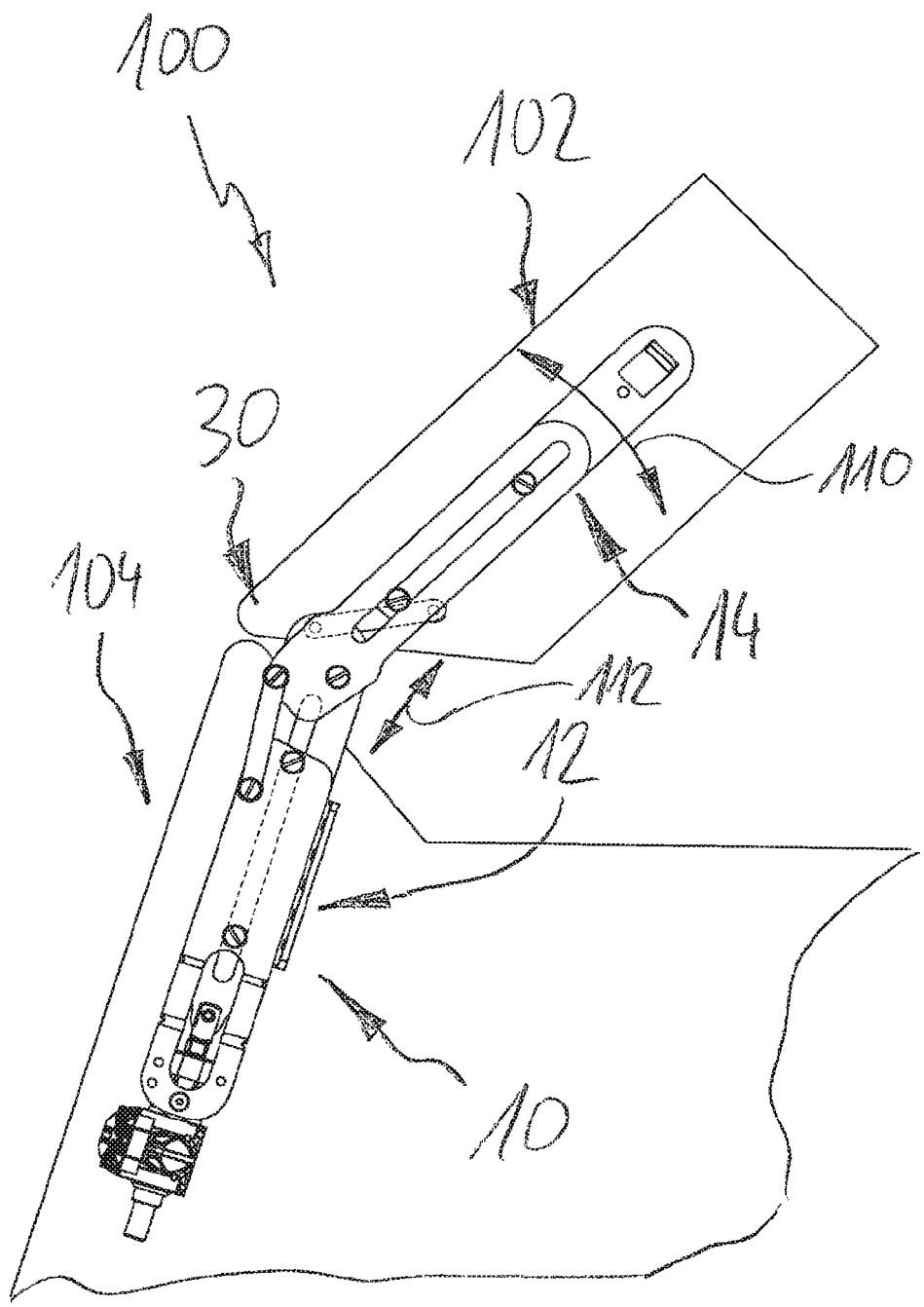
FIG. 7 is a further greatly simplified schematic partial side view of the seating furniture of FIG. 6, wherein the head part is shown in an intermediate position.
Figure 8:
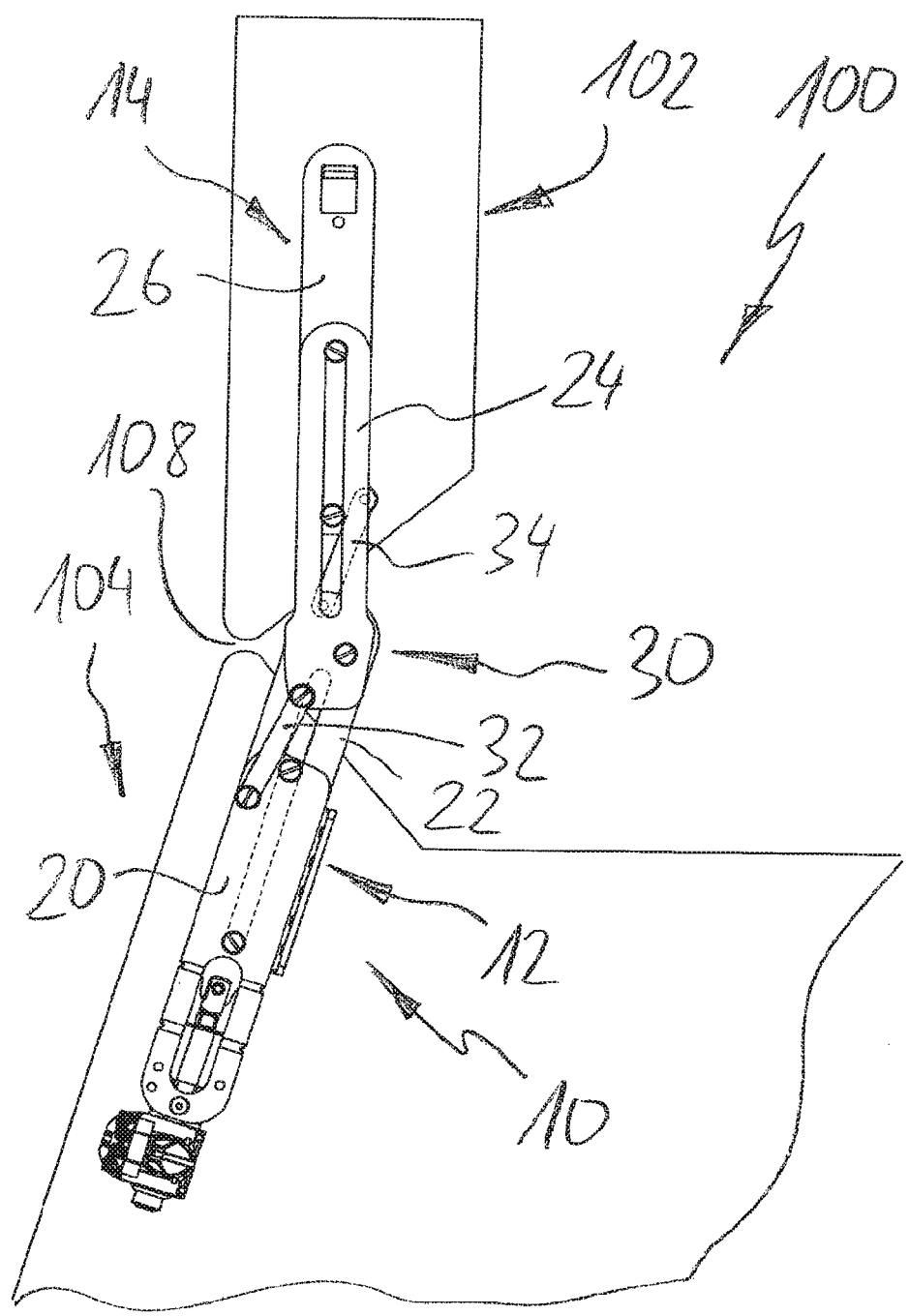
FIG. 8 is yet a further greatly simplified schematic partial side view of the seating furniture of FIGS. 6 and 7, wherein the head part is shown in a fully folded-out state.

With reference to FIGS. 6, 7 and 8, an exemplary use of the furniture fittings 10 which has been described in detail further above in connection with the FIGS. 1 to 5 will be elucidated. FIGS. 6, 7 and 8 depict in a schematic, greatly simplified illustration a partial view of a piece of furniture 100 which may be also referred to as seating furniture. The piece of furniture 100 comprises a head part 102 which may be also referred to as head rest. The head part 102 is arranged at a back rest 104 of the piece of furniture 100 via the furniture fitting 10. To this end, the furniture fitting 10 may be fixedly attached to a respective frame structure of the back rest 104 and the head part 102 in an appropriate fashion.

FIG. 6 shows the piece of furniture 100 in a state wherein the head part 102 is retracted or folded in. FIG. 8 shows a state of the piece of furniture 100, wherein the head part 102 is fully folded out or extracted. FIG. 7 shows an intermediate state between the states which are elucidated with reference to FIGS. 6 and 8. When the transfer between the first, retracted state according to FIG. 6 and the second, extracted state according to FIG. 8 takes place, not only a pivot movement between the head part 102 and the back rest 104 (refer to the double arrow 110 in FIG. 7) but also an extracting movement and/or a displacement of the head part 102 and/or of the pivot point thereof with respect to the back rest 104 (refer to a double arrow 112 in FIG. 7 which indicates the extraction movement) takes place. In this way, the piece of furniture 100 may for instance comprise in the first, retracted state according to FIG. 6 a very tight gap 106 between the head part 102 and the back rest 104. In the second, extracted state according to FIG. 6, in turn, a considerably larger gap 108 between the head part 102 and the back rest 104 is provided. The enlargement of the gap is primarily attributable to the extension movement component of the combined displacement/pivot movement of the furniture fittings 10.

Overall, the third push element 26 is namely undergoing a combined movement with respect to the support bracket 20 when the adjustment of the furniture fitting takes place, wherein the combined movement involves a pivot component (arrow 110) and a displacement component (arrow 112). The combined movement may for instance contribute to a tightening of upholstery of the piece of furniture 100 which involves that the piece of furniture 100 is having also in the second, extracted state according to FIG. 8 a high-quality visual appearance. The extension component (lifting component) of the combined adjustment movement may, however, also serve technical purposes.

Figure 9:
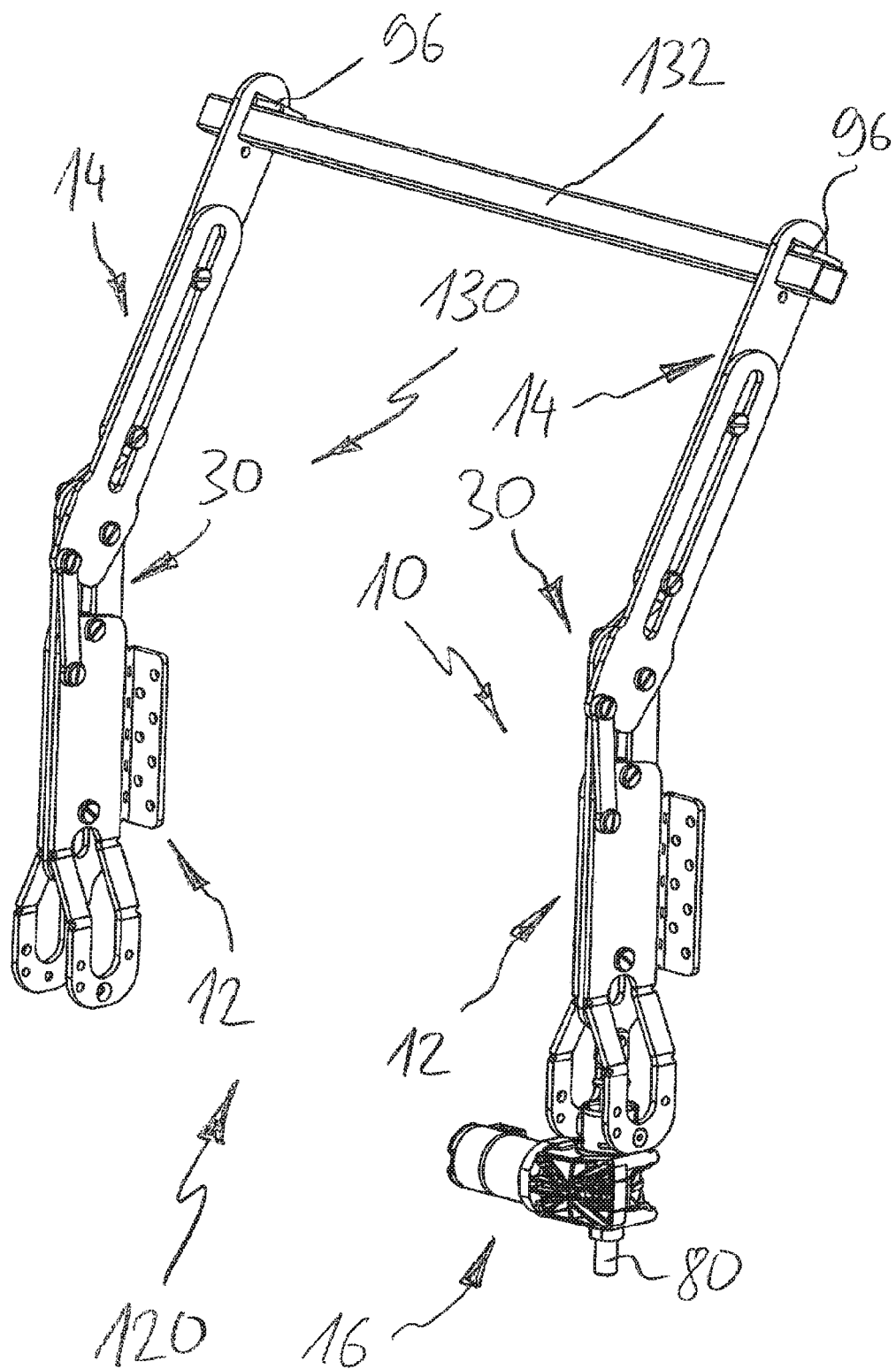
FIG. 9 is a perspective view of an arrangement having a primary furniture fitting and a secondary furniture fitting which are coupled with one another in a forced fashion via a linking piece.

FIG. 9 elucidates an arrangement 120 comprising two basically similarly shaped or even identical furniture fittings 10, 130. In an exemplary embodiment, the furniture fitting 10 is arranged in accordance with the embodiment illustrated with reference to FIGS. 1 to 5. The furniture fitting 130 is basically arranged in a similar fashion so that a more detailed description thereof may be dispensed with herein. The furniture fitting 130, however, is different from the furniture fitting 10 in that no separate drive unit is formed at the furniture fitting 130. By contrast, in an exemplary embodiment, the furniture fitting 10 is provided with the drive unit 16 which is arranged as an electromotive drive unit and which actuates the spindle 80 which is coupled with the first push element 22. Further, at the furniture fitting 130 there is no necessity of providing the spindle 80.

The furniture fittings 10, 130 are coupled to one another via a linking piece 132 which may be arranged as an attachment tube. The linking piece 132 respectively engages the recess 94 in the third push elements 26 of the furniture fittings 10, 130. It may be further envisaged that also the lugs 96 may be used for attaching the linking piece 132. In this way, a considerably rigid coupling or connection between the furniture fittings 10, 130 may be achieved. As a result, both furniture fittings 10, 130 may be basically adjusted in synchronism. This involves that the furniture fitting 10 is leading as a drive unit 16 is provided therefor. The furniture fitting 10 may be thus referred to as primary furniture fitting or also as master furniture fitting. By contrast, the furniture fitting 130 is driven in a passive fashion as it is coupled with the furniture fitting 10 via the linking piece 132 in a forced fashion. Accordingly, the second furniture fitting 130 may be for instance referred to as secondary furniture fitting or as slave furniture fitting. In an exemplary embodiment, the arrangement 120 according to FIG. 9 is suited for pieces of furniture 100 having a considerable width. Due to the two furniture fittings 10, 130, at two points that are spaced away from one another, the to-be-adjusted components of the piece of furniture 100 may be engaged. Needless to say, also arrangements 120 may be envisaged which comprise more than two furniture fittings 10, 130.

Figure 10:
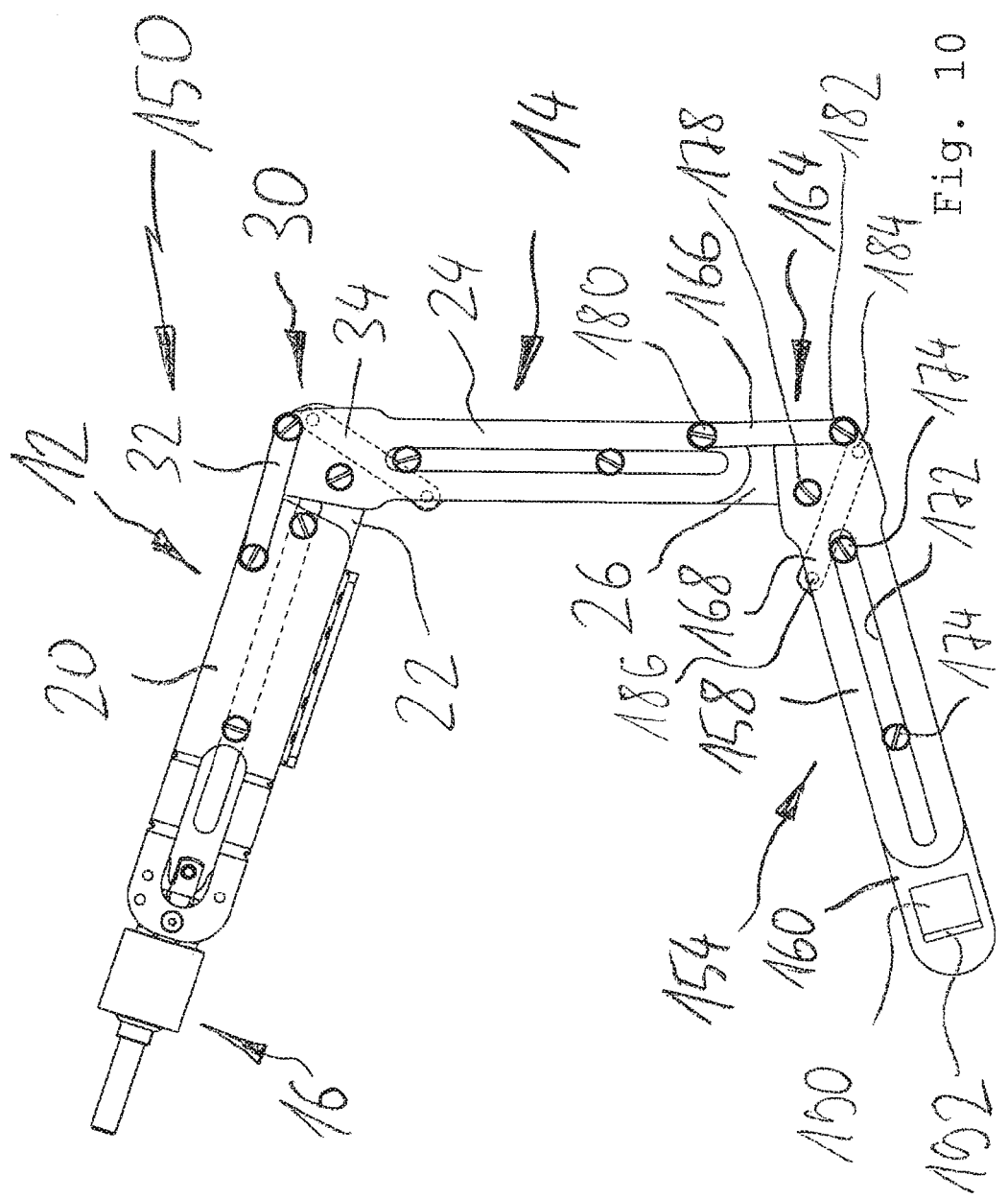
FIG. 10 a schematic side view of a furniture fitting, which is modified with respect to the furniture fitting shown in FIGS. 1 to 4, in a first, folded-in state.
Figure 11:
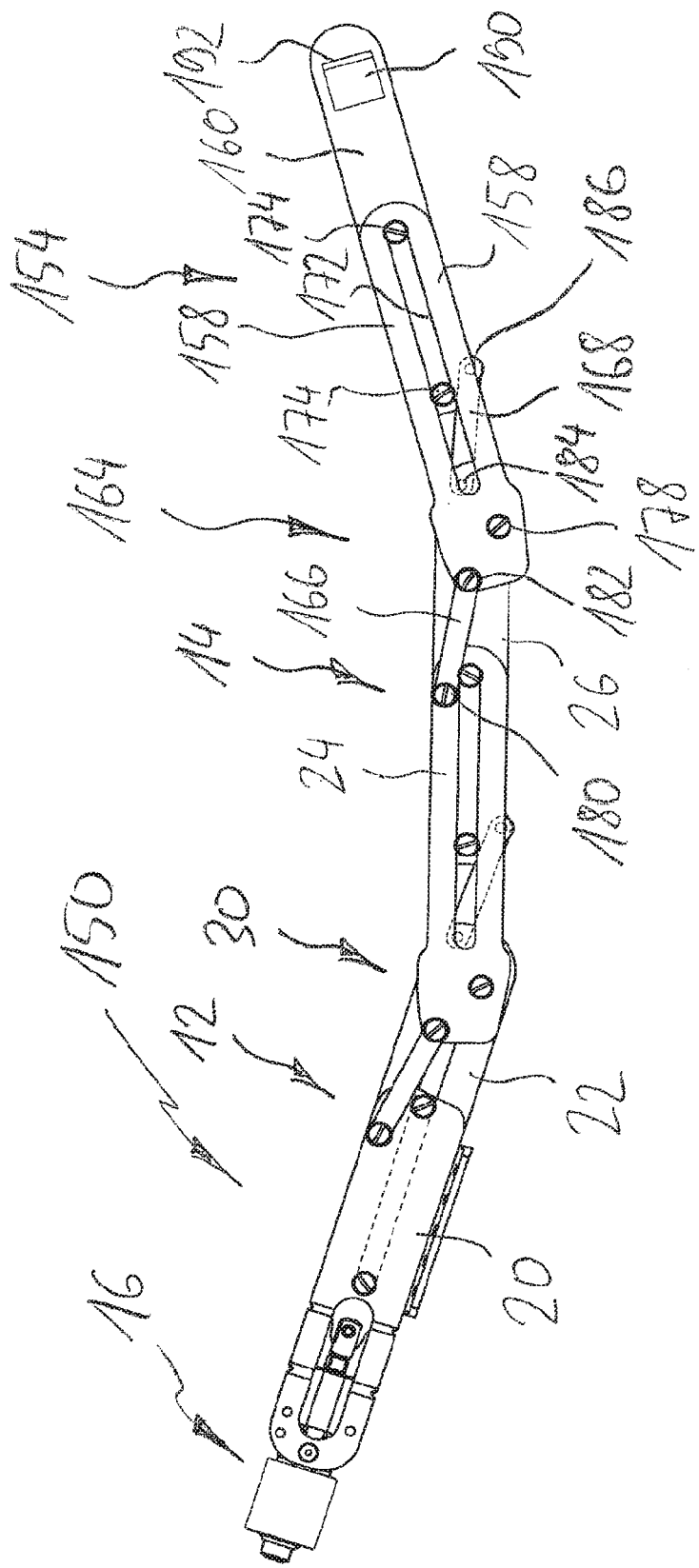
FIG. 11 a further schematic side view of the furniture fitting of FIG. 10 in a second, folded-out position.

With reference to FIGS. 10 and 11, an alternative embodiment of a furniture fitting which is overall designated by 150 will be elucidated. Basically, the furniture fitting 150 is arranged in a fashion at least similar to the furniture fitting 10 elucidated with reference to FIGS. 1 to 5. In an exemplary embodiment, as with the furniture fitting 10, also the furniture fitting 150 comprises a first slide joint unit 12, a second slide joint unit 14 and a drive unit 16 which is assigned to the first slide joint unit 12. Further, also the furniture fitting 150 comprises a first coupling mechanism 30 which couples the first slide joint unit 12 and the second slide joint unit 14 in such a way that, when the furniture fittings 150 is adjusted, between the slide joint unit 12, 14 a combined pivot/push movement is present. For a more detailed description of the first slide joint unit 12, the second slide joint unit 14, the drive unit 16 and the first coupling mechanism 30 of the furniture fittings 150, reference is made to the description as set forth above for FIGS. 1 to 5.

The furniture fitting 150, however, substantially differs from the furniture fitting 10 according to FIGS. 1 to 5 in that a third slide joint unit 154 is provided. Hence, the furniture fitting 150 may be also referred to as three-stage furniture fitting 150. The slide joint units 12, 14 and 154 are coupled to one another and form a kinematic chain. The slide joint unit 14 is arranged between the slide joint units 12 and 154. In regard of a relative movement between the third slide joint unit 154 and the first slide joint unit 12, is apparent that the furniture fitting 150 may generate considerably larger pivot angles and considerably larger lift displacements between the slide joint units 154 and 12 than would be the case with the furniture fitting 10 for the slide joint units 12 and 14.

FIG. 10 shows a first, retracted or folded-in state of the furniture fittings 150. FIG. 11 shows a second, folded-out or extracted state of the furniture fitting 150. In the first state according to FIG. 1, the slide joint units 12, 14 and 154 are arranged in a basically U-shaped fashion. By contrast, the slide joint units 12, 14 of the furniture fitting 10 in the first state according to FIG. 1 are arranged in a basically L-shaped fashion. In the second state, both the furniture fitting 10 (refer to FIG. 3) and the furniture fitting 150 (refer to FIG. 11) have an elongated orientation, wherein the second slide joint unit 14 (at the furniture fitting 10) and the second slide joint unit 14 and the third slide joint unit 154 (at the furniture fitting 150) are even pivoted slightly beyond an rectilinear orientation with respect to the first slide joint unit 12.

In the alternative to the embodiments of the furniture fitting 150 elucidated with reference to FIGS. 10 and 11, embodiments may be envisaged, wherein the furniture fitting 150, in the first (retracted) state involves a respective angle of about 90° between its neighboring slide joint units 12, 14 and 154, and wherein the furniture fitting 150, in the second (extracted) state involves a respective angle of about 180° between its neighboring slide joints 12, 14, 154. This may be caused by a respective design of the coupling mechanisms 30, 164. It goes without saying that also deviating configurations may be implemented about further ado.

The furniture fitting 150 comprises a fourth push element 158 and a fifth push element 160. The fourth push element 158 and the fifth push element 160 are assigned to the third slide joint unit 154. The fourth push element 158 and the fifth push element 160 are coupled to one another in a longitudinally displaceable fashion. The third slide joint unit 154 is coupled with the second slide joint unit 14 via a second coupling mechanism 164. The second coupling mechanism 164 is basically arranged in a similar fashion to the first coupling mechanism 30. Accordingly, the second coupling mechanism 164 of the furniture fittings 150 comprises two four-joint linkage mechanisms which are formed on the basis of the second push element 24, the third push element 26, the fourth push element 158 and the fifth push element 160. The second coupling mechanism 164 comprises a third linking piece 166 and a fourth linking piece 168. The linking pieces 166, 168 may be also referred to as lever or coupling lever.

Each of the four-joint linkage mechanisms comprises a slide joint which is arranged between two push elements 24, 26 (at the second slide joint unit 14) and push elements 158, 160 (at the third slide joint unit 164) which are coupled to one another. To this end, for instance, an elongated slot 172 is formed at the fourth push element 158 which is engaged by two guide bolts 174 which are arranged at the fifth push element 160 in a fashion space from one another. In this way, the fifth push element 160 is received in the elongated slot 172 of the fourth push element 158 in a longitudinally displaceable fashion via the guide bolts 174.

The fourth push element 158 is received at the third push element 126 via a swivel joint, which is formed by a bearing 178. The third linking piece 166 connects the second push element 24 and the fourth push element 158. To this end, swivel joints are provided, refer a coupling point 180 between the third linking piece 166 and the second push element 24, and a coupling point 182 between the third linking piece 166 and the fourth push element 158. Hence, the second push element 24, the third push element 26, the fourth push element 158 and the third linking piece 166 together form a four-joint, for instance a planar four-joint, which involves three swivel joints and a slide joint (between the second push element 24 and the third push element 26).

The fourth linking piece 168 connects the third push element 26 and the fifth push element 160. To this end, a swivel joint is provided between the fourth linking piece 168 and the third push element 26, refer to a coupling point 184. Further, between the fourth linking piece 168 and the fifth push element 160, a swivel joint is provided, refer to a coupling point 186 in the FIGS. 10 and 11. Overall, also the third push element 26, the fourth push element 158, the fifth push element 160 and the fourth linking piece 168 form a four-joint which may be also referred to as planar four-joint or as four-joint mechanism. The four-joint comprises three swivel joints and a slide joint. A swivel joint is defined by the bearing 178 between the third push element 26 and the fourth push element 158. Hence, both four-joints which are provided at the second coupling mechanism 164 comprise a common swivel joint, the bearing 178. Two further swivel joints are provided by the coupling points 184, 186. The slide joint is formed by the elongated slot 172 and the guide bolt 174 which are formed at the fourth push element 158 and the fifth push element 160.

It goes without saying that, in an exemplary embodiment, the coupling mechanisms 30, 164 may be modified so as to alter target positions of the slide joint units 12, 14 (furniture fitting 10) and 12, 14, 154 (furniture fitting 150), respectively.

Depending on the design of the first coupling mechanism 30 and the second coupling mechanism 164, the first slide joint unit 12 and the second slide joint unit 14, and also the second slide joint unit 14 and the third slide joint unit 154 may perform relative movements with respect to one another having the same direction and being of the same kind, when the furniture fitting 150 is adjusted. However, it may be also envisaged to implement for instance the second coupling mechanism 164, in contrast to the first coupling mechanism 30, in such a way that, when the furniture fitting 150 is adjusted, the relative movement between the third slide joint unit 154 and the second slide joint unit 14 is having an opposing direction to the relative movement between the second slide joint unit 14 and the first slide joint unit 12. In other words, a furniture fitting which is modified in accordance with the above, may assume at least temporarily a state, wherein a Z-shaped configuration is present, in contrast to the U-shaped configuration shown in FIG. 10. Further states may be envisaged without further ado.

As with the recess 94 and the lug 96 assigned thereto for the furniture fitting 10 according to FIGS. 1 to 5, which are arranged at the third push element 26 thereof, also the furniture fitting 150 according to FIGS. 10 and 11 may comprise a recess 190 and a lug 192 assigned thereto which are formed at the fifth push element 160, i.e. at the third slide joint unit 154. In this way, as with the arrangement 120 of FIG. 9, an arrangement may be provided, wherein a plurality of furniture fittings 150 are provided which are coupled to one another by an appropriate linking piece so as to be adjusted in synchronism. It goes without saying that only one of the furniture fittings 150 has to be provided with a respective drive unit 16.

It may be basically envisaged, as a further development of the two-stage embodiment of the furniture fitting 10 according to FIGS. 1 to 5 and of the three-stage furniture fitting 150 according to FIGS. 10 and 11, that further stages, i.e. further slide joint units, may be provided which extend the kinematic chain of the furniture fitting. In an exemplary embodiment, it may be envisaged to couple four slide joint units, five slide joint units or even more slide joint units with another via appropriate coupling mechanisms.

Figure 12:
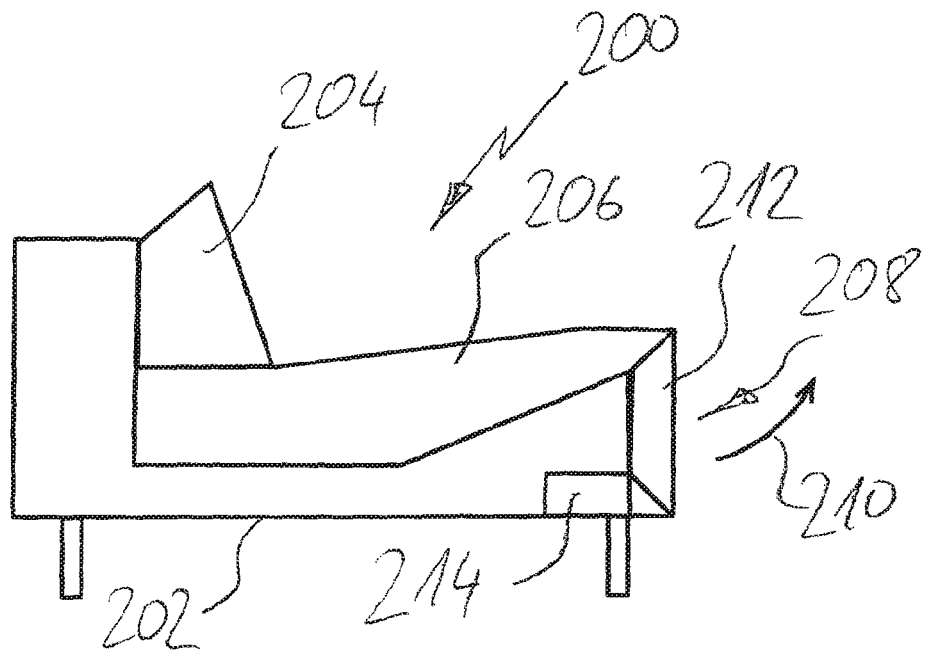
FIG. 12 a greatly simplified schematic side view of a piece of furniture comprising an adjustable foot rest.
Figure 13:
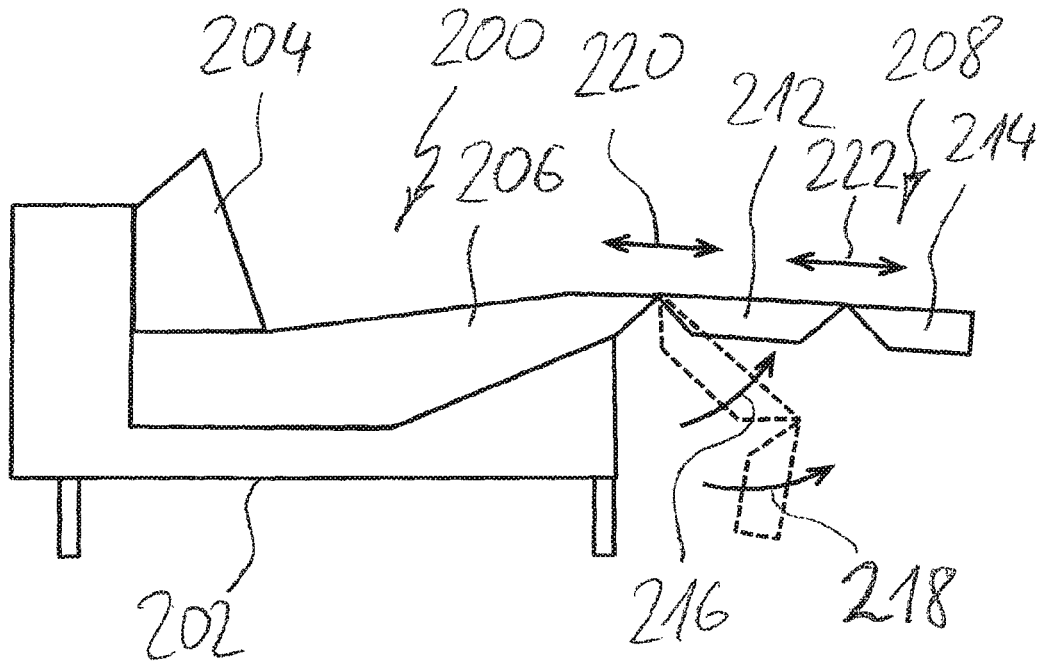
FIG. 13 a further greatly simplified schematic side view of the piece of furniture according to FIG. 12, wherein the foot rest is extracted.

With reference to FIGS. 12 and 13, an exemplary use of the furniture fittings 150 will be elucidated. In contrast to FIGS. 7 and 8 which show an exemplary use of the furniture fitting 10 for head rest adjustment, FIG. 12 and FIG. 13 illustrate a use of the furniture fitting 150 for foot part adjustment at a piece of furniture 200, for instance a seating furniture. FIGS. 12 and 13 respectively illustrate a greatly simplified schematic side view of a piece of furniture 200, for instance of a sofa or an armchair. The piece of furniture 200 comprises a frame 202, a back rest 204 and a seating support or seating surface 206. Further, the piece of furniture 200 comprises an integrated foot rest 208. The piece of furniture 200 may assume at least two configurations or states. FIG. 12 elucidates a first state in which the foot rest 208 is fully retracted and/or folded in. In this state, the foot rest 208 is not providing a substantial function. FIG. 13 shows a further state in which the foot rest 208 is fully extracted or folded out. In a second state, a user of the piece of furniture may thus place his/her legs or feet at the foot rest 208. In FIG. 12, an arrow designated by 210 indicates the basically provided adjustability of the foot rest 208.

The foot rest 208 comprises a connecting segment or linking piece 212 and a support segment or support piece 214. The linking piece 212 is arranged between the seating surface 206 (and/or a frame or rack of the seating surface 206) and the support piece 214. The seating surface 206 (and/or the frame or rack thereof), the linking piece 212 and the support piece 214 are coupled to one another via a furniture fitting which basically corresponds to the furniture fitting 150 which is elucidated with reference to FIGS. 10 and 11. For illustrative purposes, the furniture fitting 150 is not explicitly shown in FIGS. 12 and 13. The first state of the furniture fitting 150 according to FIG. 10 basically corresponds to the first state of the foot rest 208 which is illustrated in FIG. 12. The second state of the furniture fitting 150 according to FIG. 11 substantially corresponds to the second state of the foot rest 208 which is illustrate in FIG. 13.

In FIG. 13, by means of dashed lines, further an intermediate state and/or an intermediate position of the foot rest 208 is indicated. It goes without saying that at least in some embodiments of the furniture fitting 150, also intermediate states may be envisaged, wherein the furniture fitting 150 and hence also the foot rest 208 can be fixated.

When the foot rest 208 is extracted or folded out, a combined movement of the segments (linking piece 212, support piece 214) of the foot rest 208 is present. The linking piece 212 is moved with respect to the seating surface 206 to which it is connected in a pivotable fashion. The support piece 214 is moved with respect to the linking piece 212 to which it is connected in a pivotable fashion. As already elucidated further above in connection with FIGS. 6 to 8, the above involves not only a pivot movement but also a longitudinal movement (lifting movement) of the involved components or segments. The movement components of the movement of the linking piece 212 are indicated in FIG. 13 by a rectilinear arrow 220 (longitudinal movement or "expansion") and by a curved arrow 216 (pivot movement). Similarly, the movement components of the movement of the support piece 214 in FIG. 13 are indicated by a rectilinear arrow 222 (longitudinal movement or "expansion") and a curved arrow 218 (pivot movement). Hence, when the foot rest 208 is extended, in addition to the pivot movement, further also an "expansion" or a "stretching" of the foot rest 208 is present. In this way, upholsteries or covers of the piece of furniture 200 may be tightened. As a result, a basically wrinkle-free state may be achieved which may be perceived as high-grade and visually appealing.

It may be envisaged that pieces of furniture comprise both a head rest adjustment according to FIGS. 6 to 8 and a foot rest adjustment according to FIGS. 12 and 13.

It goes without saying that the furniture fittings 10, 150 and arrangements 120 comprising a plurality of furniture fittings 10, 130, 150 may be also used in another context for pieces of furniture. Nevertheless, head part adjustment and/or foot part adjustment may be regarded as a fundamental field of application. The furniture fittings 10, 150 may be however also used for foldable tables, fold-out arm rests, foldable beds and similar pieces of furniture. A further beneficial field of application may involve working furniture and such like. The adjustability of the furniture fittings 10, 150 may be for instance used for fold-out or extendable carriers for screens and similar display devices/working devices. It may be further envisaged to use the furniture fittings 10, 150 to adjust carriers that support, for instance, input devices (keyboards and such like) which are arranged to be moved between a first, retracted state and a second, extracted state.

In the following, substantial aspects of the present disclosure will be summarized with respect to exemplary embodiments:

According to a first aspect, the present disclosure relates to an electromotive furniture fitting for head rest adjustment, comprising a support bracket 20, a first push element 22, a second push element 24, which is pivotable with respect to the first push element 22, and a third push element 26, which is, in turn, pivotable with respect to the first push element 22 and which is longitudinally displaceable with respect to the second push element 24, wherein the longitudinal displacement of the first push element 22 induces a pivot movement of the second push element 24 including a relative movement with respect to the first push element 22 and, resulting therefrom, an extending movement of the third push element 26.

According to a beneficial embodiment of this aspect, a pivoting movement of the second push element 24 about a bearing 68 effects, via a lever mechanism, an extending movement of the third push element 26.

According to a further beneficial embodiment of the afore-mentioned aspect, a second furniture fitting is provided which is coupled via an attachment tube with the first furniture fitting which is movable together with the first furniture fitting without a motor in a force-coupled fashion.

Aspects of the disclosure relate to an electromotive furniture fitting 10, comprising a support bracket 20, which may be for instance attached to a back rest 104 of a seating furniture 100. For instance, a push element 26 may be attached to a head rest support 102. An electromotor 88 is coupled with the support bracket 20. A push element 22 is coupled with a spindle 80.

The push element 22 is supported and secured against rotation in the support bracket 20 by guide elements 58. A push element 24 is mounted at the push element 22 in a pivotable fashion. Further, the push element 24 is mounted in a pivotable fashion to the support bracket 20 via the lever. A push element 26 is supported by the guide elements 64 and guided in a non-rotatable longitudinally displaceable fashion. The push element 26 is pivotably mounted at the push element 22 via a lever.

A mounting point 94 is, via an attachment tube 132, fixedly attached, in a fashion secured against rotation, to a second furniture fitting 130 which does not require an electromotor, in such a way that the furniture fitting 130 is coupled in a forced fashion.

By extracting the push element 22, the push element 24 is pivoted about a bearing 68, as the lever is coupled with the support bracket 20 and the push element 24 in a rotatable fashion. Due to the pivot movement of the push element 24, a forced-coupled extending movement of the push element 26 with respect to the push element 24 is per-formed, as the lever is coupled with the push element 24 in a rotatably mounted fashion. Further, the push element 22 performs an advancing extending movement to the push element 26.

Merely by the retracting and extracting movement of the spindle 80, the coupled slidability and pivotability of the push elements 22, 24 and 26 is induced. This structure is robust and reliable, simple and configured in a cost-efficient fashion. The small dimensions enable also the application in delicate seating furniture. FIG. 5 shows the furniture fitting 10 in the state of FIG. 3, however, in a frontal view, wherein the small width of the fitting can be seen. Here, the electromotor 88 is arranged in a 90° state with respect to the furniture fitting 10. It goes without saying that also other combinations regarding the mode of operation (for instance Bowden wire) or the mounting orientation may be used without departing from the scope of the present disclosure.

As can be seen from the sequence shown in FIGS. 6, 7 and 8, the extending movement of the furniture fitting 10 does not only swivel the head rest support 102 but also enlarges a gap 106, 108. In this way, the upholstery of the seating furniture 100 is retained in a stretched fashion, and an undesired formation of wrinkles may be avoided.

What is claimed is:

1. A furniture fitting, comprising:
   a support bracket and a first push element that form a first slide joint unit,
   a second push element and a third push element that form a second slide joint unit,
   a first coupling mechanism extending between the first slide joint unit and the second slide joint unit,
   wherein the support bracket and the first push element are slidably coupled with one another,
   wherein the second push element and the third push element are slidably coupled with one another,
   wherein the second push element is pivotably mounted at the first push element,
   wherein the first slide joint unit and the second slide joint unit are coupled with one another in such a way that a longitudinal displacement of the first push element with respect to the support bracket causes a pivoting movement of the second push element with respect to the first push element and, associated therewith, an extending movement of the third push element,
   wherein the first coupling mechanism comprises a first linking piece and a second linking piece,
   wherein the first linking piece is operatively coupled with the support bracket and the second push element, and forms a link therebetween, and
   wherein the second linking piece is operatively coupled with the first push element and the third push element, and forms a link therebetween,
   a fourth push element and a fifth push element that form a third slide joint unit,
   wherein the fourth push element and the fifth push element are slidably coupled with one another,
   wherein the fourth push element is pivotably mounted at the third push element, and
   wherein the second slide joint unit and the third slide joint unit are coupled with one another in such a way that a longitudinal displacement of the third push element with respect to the second push element causes a pivoting movement of the fourth push element with respect to the third push element and, associated therewith, an extending movement of the fifth push element, and
   a second coupling mechanism extending between the second slide joint unit and the third second slide joint unit,
   wherein the second coupling mechanism comprises a third linking piece and a fourth linking piece,
   wherein the third linking piece is operatively coupled with the fourth push element and the second push element,
   wherein the fourth linking piece is operatively coupled with the fifth push element and the third push element,
   wherein the third linking piece causes a pivoting movement of the fourth push element with respect to the third push element when a longitudinal displacement between the third push element and the second push element takes place, and
   wherein the fourth linking piece causes a longitudinal displacement between the fourth push element and the fifth push element when a relative pivoting between the third push element and the fourth push element takes place.

2. The furniture fitting as claimed in claim 1,
   wherein the support bracket, the first push element, the second push element and the third push element form components of a planar coupling arrangement.

3. The furniture fitting as claimed in claim 2, further comprising:
   a first four joint linkage mechanism formed by the support bracket, the first push element, the second push element and the first linking piece, and
   a second four joint linkage mechanism formed by the first push element, the second push element, the third push element and the second linking piece,
   wherein the first four joint linkage mechanism and the second four joint linkage mechanism are operatively coupled with one another by the first coupling mechanism.

4. The furniture fitting as claimed in claim 3,
   wherein the first four joint linkage mechanism comprises three pivot joints and a slide joint, and
   wherein the second four joint linkage mechanism comprises three pivot joints and a slide joint.

5. The furniture fitting as claimed in claim 1,
   wherein the first push element is arranged at the support bracket in a longitudinally displaceable direction relative to the support bracket, and
   wherein the third push element is arranged at the second push element in a longitudinally displaceable direction relative to the second push element.

6. The furniture fitting as claimed in claim 1,
   wherein a pivoting movement of the second push element about a bearing at the first push element causes an extending movement of the third push element with respect to the second push element.

7. The furniture fitting as claimed in claim 1,
   wherein the support bracket and the first push element are coupled to one another via a slot and bolts arrangement for relative longitudinal displacement therebetween, and
   wherein the second push element and the third push element are coupled to one another via a slot and bolts arrangement for relative longitudinal displacement therebetween.

8. The furniture fitting as claimed in claim 1,
   wherein the first linking piece and the second linking piece are arranged at sides of the first push element that are facing away from one another, and
   wherein the first push element, the second push element and the third push element form a stack and are, in a direction perpendicular to a common movement plane of the furniture fitting, arranged between the first linking piece and the second linking piece.

9. The furniture fitting as claimed in claim 1,
wherein the first push element and the third push element are arranged in a common plane which is offset from a plane in which the second push element is arranged.

10. The furniture fitting as claimed in claim 1,
wherein the support bracket, the first push element, the second push element, the third push element, the fourth push element and the fifth push element form components of a planar coupling arrangement.

11. The furniture fitting as claimed in claim 1, further comprising:
a third four joint linkage mechanism formed by the second push element, the third push element, the fourth push element and the third linking piece, and
a fourth four joint linkage mechanism formed by the third push element, the fourth push element, the fifth push element and the fourth linking piece,
wherein the third four joint linkage mechanism comprises three pivot joints and a slide joint,
wherein the fourth four joint linkage mechanism comprises three pivot joints and a slide joint, and
wherein the third four joint linkage mechanism and the fourth four joint linkage mechanism are operatively coupled with one another by the second coupling mechanism.

12. The furniture fitting as claimed in claim 1,
wherein at least two of the push elements are arranged as basically flat sheet metal material parts.

13. The furniture fitting as claimed in claim 1, wherein at least two of the push elements are arranged as substantially planar punching parts made from flat sheet metal material.

14. The furniture fitting as claimed in claim 1,
wherein the support bracket comprises a first support piece and a second support piece which are formed from sheet metal material, and
wherein the first support piece and the second support piece define therebetween a guide gap for the first push element,
wherein at least one of the first support piece and the second support piece comprises a bended section which is formed as a mounting lug for mounting at a piece of furniture.

15. The furniture fitting as claimed in claim 1,
wherein the first push element is operatively coupled with a threaded spindle which is guided in a bearing piece arranged at the support bracket.

16. A furniture fitting, comprising:
a support bracket and a first push element that form a first slide joint unit,
a second push element and a third push element that form a second slide joint unit,
a first coupling mechanism extending between the first slide joint unit and the second slide joint unit,
wherein the support bracket and the first push element are slidably coupled with one another,
wherein the second push element and the third push element are slidably coupled with one another,
wherein the second push element is pivotably mounted at the first push element, wherein the first slide joint unit and the second slide joint unit are coupled with one another in such a way that a longitudinal displacement of the first push element with respect to the support bracket causes a pivoting movement of the second push element with respect to the first push element and, associated therewith, an extending movement of the third push element,
wherein the first coupling mechanism comprises a first linking piece and a second linking piece,
wherein the first linking piece is operatively coupled with the support bracket and the second push element, and
wherein the second linking piece is operatively coupled with the first push element and the third push element,
a fourth push element and a fifth push element that form a third slide joint unit,
a second coupling mechanism extending between the second slide joint unit and the third second slide joint unit,
wherein the fourth push element and the fifth push element are slidably coupled with one another,
wherein the fourth push element is pivotably mounted at the third push element,
wherein the second slide joint unit and the third slide joint unit are coupled with one another in such a way that a longitudinal displacement of the third push element with respect to the second push element causes a pivoting movement of the fourth push element with respect to the third push element and, associated therewith, an extending movement of the firth push element,
wherein the support bracket, the first push element, the second push element, the third push element, the fourth push element and the fifth push element form components of a planar coupling arrangement,
wherein the second coupling mechanism comprises a third linking piece and a fourth linking piece,
wherein the third linking piece is operatively coupled with the fourth push element and the second push element,
wherein the fourth linking piece is operatively coupled with the fifth push element and the third push element,
wherein the third linking piece causes a pivoting movement of the fourth push element with respect to the third push element when a longitudinal displacement between the third push element and the second push element takes place, and
wherein the fourth linking piece causes a longitudinal displacement between the fourth push element and the fifth push element when a relative pivoting between the third push element and the fourth push element takes place.

17. A seating furniture, comprising:
a frame;
a support piece coupled to the frame; and
a furniture fitting coupling the support piece to the frame, the furniture fitting comprising:
a support bracket and a first push element that form a first slide joint unit,
a second push element and a third push element that form a second slide joint unit,
a first coupling mechanism extending between the first slide joint unit and the second slide joint unit,
wherein the support bracket and the first push element are slidably coupled with one another,
wherein the second push element and the third push element are slidably coupled with one another,
wherein the second push element is pivotably mounted at the first push element,
wherein the first slide joint unit and the second slide joint unit are coupled with one another in such a way that a longitudinal displacement of the first push element with respect to the support bracket causes a pivoting movement of the second push element with respect to the first push element and, associated therewith, an extending movement of the third push element, wherein the first coupling mechanism comprises a first linking piece and a second linking piece, wherein the first linking piece is operatively coupled with the support bracket and the second push element, and forms a link therebetween, and wherein the second linking piece is operatively coupled with the first push element and the third push element, and forms a link therebetween, a fourth push element and a fifth push element that form a third slide joint unit, wherein the fourth push element and the fifth push element are slidably coupled with one another, wherein the fourth push element is pivotably mounted at the third push element, and wherein the second slide joint unit and the third slide joint unit are coupled with one another in such a way that a longitudinal displacement of the third push element with respect to the second push element causes a pivoting movement of the fourth push element with respect to the third push element and, associated therewith, an extending movement of the firth push element, and a second coupling mechanism extending between the second slide joint unit and the third second slide joint unit, wherein the second coupling mechanism comprises a third linking piece and a fourth linking piece, wherein the third linking piece is operatively coupled with the fourth push element and the second push element, wherein the fourth linking piece is operatively coupled with the fifth push element and the third push element, wherein the third linking piece causes a pivoting movement of the fourth push element with respect to the third push element when a longitudinal displacement between the third push element and the second push element takes place, and wherein the fourth linking piece causes a longitudinal displacement between the fourth push element and the fifth push element when a relative pivoting between the third push element and the fourth push element takes place.

18. The seating furniture of claim 17, further comprising:

a linking piece disposed between the frame and the support piece, wherein the frame, the linking piece, and the support piece are coupled to one another via the furniture fitting.

19. The seating furniture of claim 18, wherein the linking piece and the support piece comprise a foot rest for the seating furniture, and wherein the seating furniture further comprises a head rest support and a coupling furniture fitting, the coupling furniture fitting identical to the furniture fitting and coupling the head rest support to the frame.

20. The seating furniture of claim 18, wherein the support bracket, the first push element, the second push element, the third push element, the fourth push element and the fifth push element form components of a planar coupling arrangement.

\* \* \* \* \*